US012217685B2

(12) United States Patent
Song et al.

(10) Patent No.: US 12,217,685 B2
(45) Date of Patent: Feb. 4, 2025

(54) DISPLAY DEVICE

(71) Applicant: Samsung Display Co., Ltd., Yongin-si (KR)

(72) Inventors: Heerim Song, Yongin-si (KR); Cheol-Gon Lee, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/450,786

(22) Filed: Aug. 16, 2023

(65) Prior Publication Data

US 2024/0112632 A1 Apr. 4, 2024

(30) Foreign Application Priority Data

Oct. 4, 2022 (KR) ........................ 10-2022-0126539

(51) Int. Cl.
*G09G 3/3233* (2016.01)
*G06F 3/041* (2006.01)
*G06F 3/042* (2006.01)
*G06V 40/13* (2022.01)

(52) U.S. Cl.
CPC ......... *G09G 3/3233* (2013.01); *G06F 3/0412* (2013.01); *G06F 3/04166* (2019.05); *G06F 3/042* (2013.01); *G06V 40/1318* (2022.01); *G09G 2300/0819* (2013.01);
(Continued)

(58) Field of Classification Search
CPC ......... G09G 3/3233; G09G 2300/0819; G09G 2300/0842; G09G 2310/08; G09G 2354/00; G06F 3/0412; G06F 3/04166; G06F 3/042; G06F 3/0446; G06F 3/0445; G06F 3/043; G06F 3/0416; G06F 3/046; G06V 40/1318; H01L 27/124; H01L 27/1255; H01L 27/156; H10K 59/121; H10K 59/131; H10K 59/40; H10K 50/844

See application file for complete search history.

(56) References Cited

U.S. PATENT DOCUMENTS 6,977,463 B2    12/2005  Sato
9,277,147 B2 *  3/2016   Beck .................... H04N 25/59
10,957,749 B2 * 3/2021   Jung .................... G09G 3/3225
(Continued)

FOREIGN PATENT DOCUMENTS

KR    10-2021-0114960 A    9/2021

*Primary Examiner* — Christopher E Leiby
(74) *Attorney, Agent, or Firm* — Lewis Roca Rothgerber Christie LLP

(57) ABSTRACT

A display device includes a plurality of pixels, each of which includes a light emitting element and a pixel driving circuit and a plurality of sensors, each of which includes a light receiving element and a sensor driving circuit. A sensor driving circuit included in at least one of sensors includes a reset transistor configured to output a reset signal to a first sensing node in response to a reset control signal, an amplification transistor connected to first and second sensing nodes and configured to receive a sensor driving voltage, a first output transistor connected between the second sensing node and a readout line and configured to receive a first output control signal, and a second output transistor connected between the second sensing node and the readout line and configured to receive a second output control signal.

20 Claims, 13 Drawing Sheets

(52) U.S. Cl.
CPC . *G09G 2300/0842* (2013.01); *G09G 2310/08* (2013.01); *G09G 2354/00* (2013.01)

(56) References Cited

U.S. PATENT DOCUMENTS

| | | | |
|---|---|---|---|
| 2017/0076671 A1* | 3/2017 | Kim | G09G 3/3258 |
| 2020/0321387 A1* | 10/2020 | Jang | H04N 25/76 |
| 2021/0158751 A1* | 5/2021 | Cha | H10K 65/00 |
| 2022/0012453 A1* | 1/2022 | Choi | H10K 59/1216 |
| 2022/0102430 A1 | 3/2022 | Yamazaki et al. | |
| 2023/0081342 A1* | 3/2023 | Lin | H10K 59/126 |
| | | | 345/211 |
| 2023/0112708 A1* | 4/2023 | Toyotaka | G09G 3/3666 |
| | | | 345/89 |

* cited by examiner

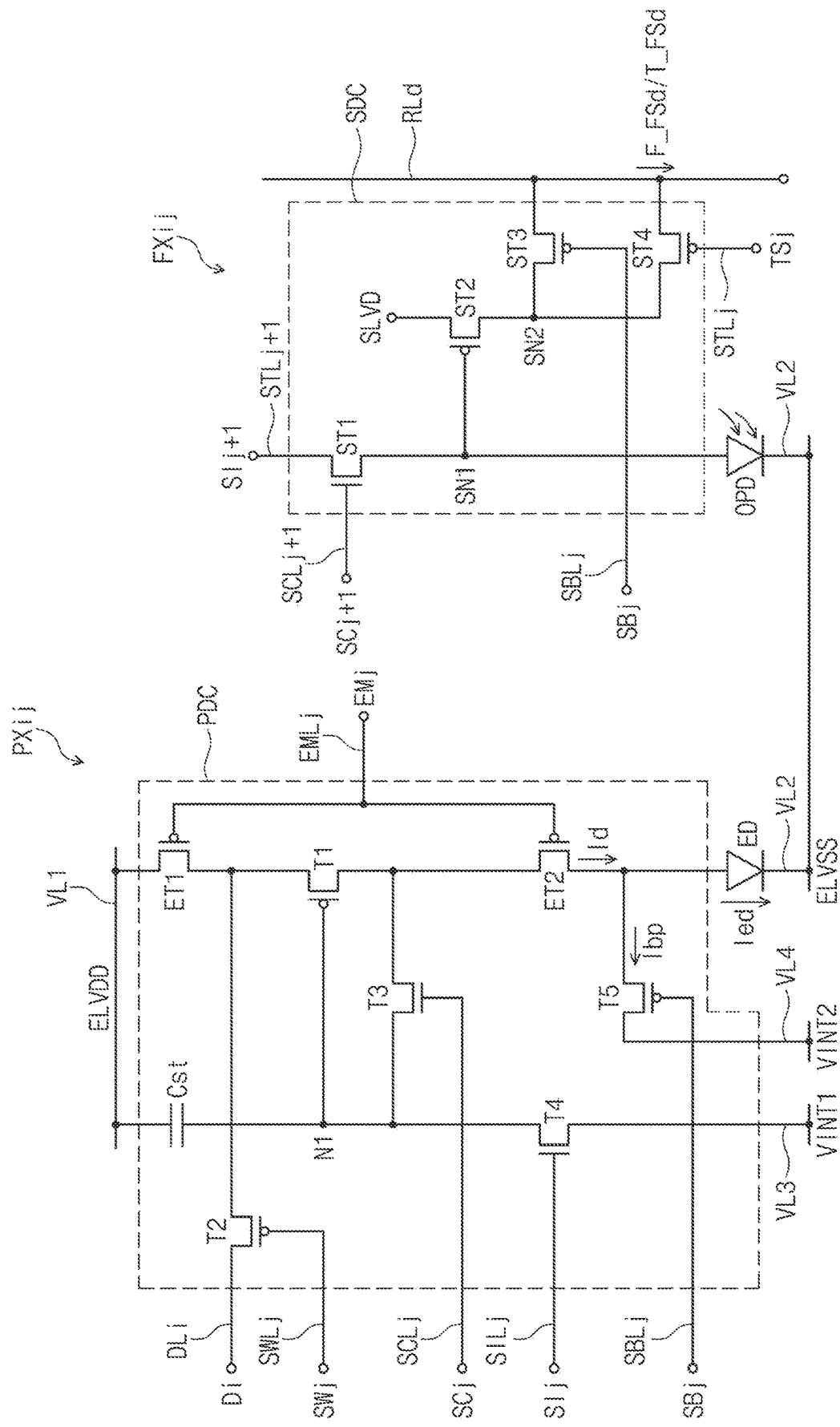

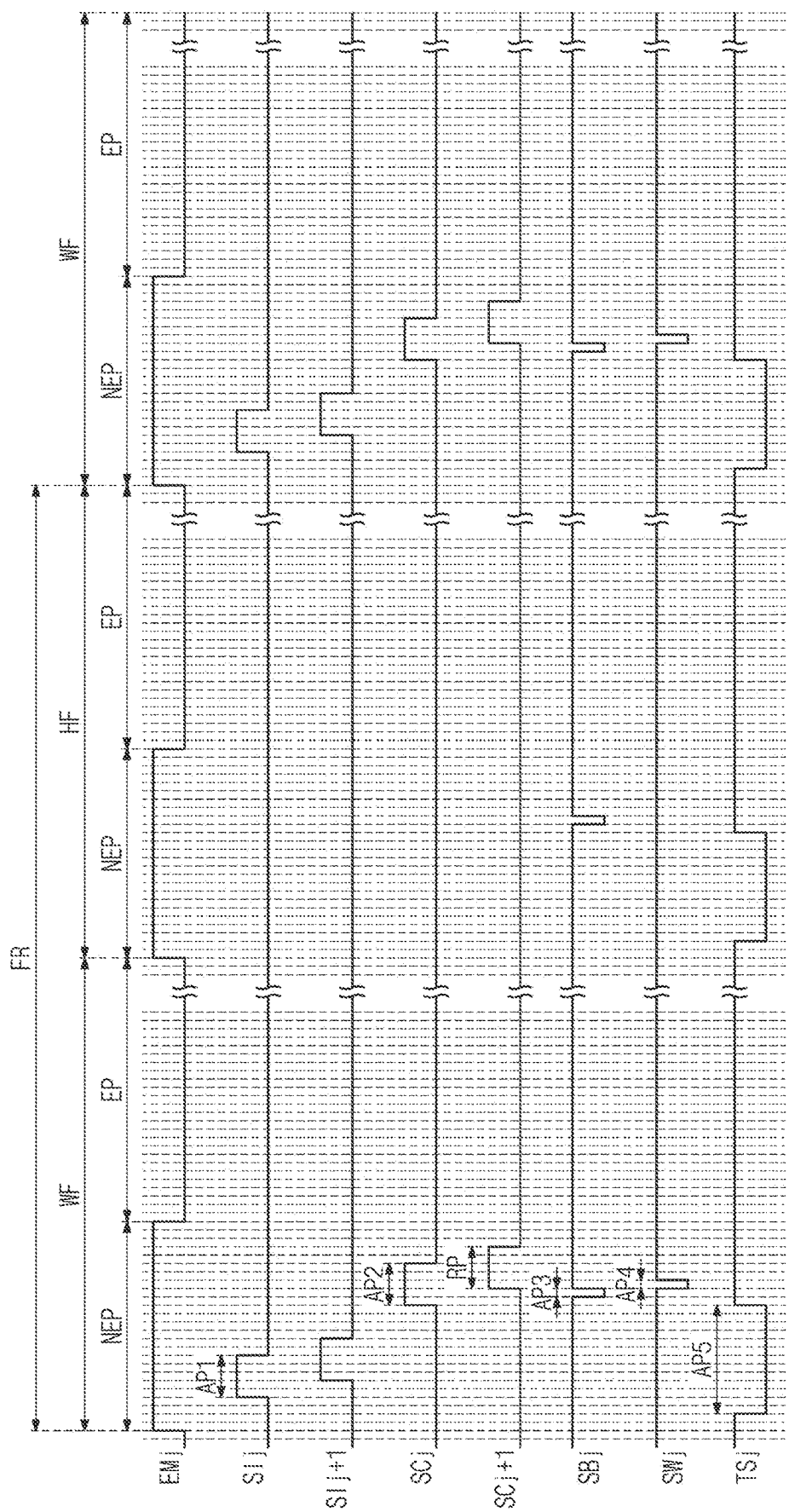

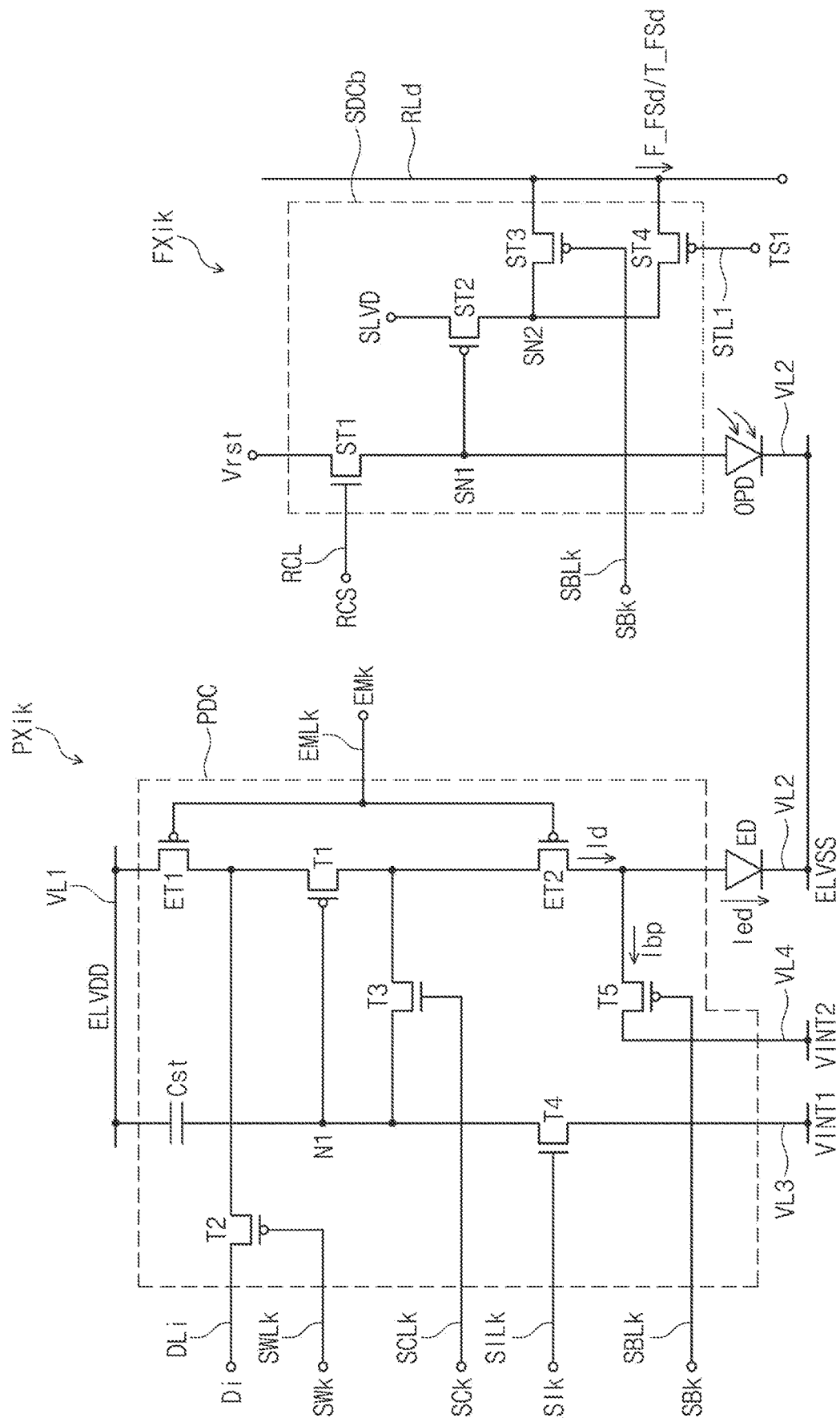

DISPLAY DEVICE

CROSS-REFERENCE TO RELATED APPLICATION

The present application claims priority to and the benefit of Korean Patent Application No. 10-2022-0126539 filed on Oct. 4, 2022, in the Korean Intellectual Property Office, the entire disclosure of which is incorporated herein by reference.

BACKGROUND

1. Field

Aspects of some embodiments of the present disclosure described herein relate to a display device.

2. Description of Related Art

A display device provides various functions to provide information to a user by displaying images or to communicate organically with the user, such as detecting user input. Additionally, a display device may include a function to detect the user's biometric information.

Biometric information recognition mechanisms include, for example, a capacitive sensor that detects a change in capacitance between electrodes, an optical sensor that detects incident light by using an optical sensor, and an ultrasonic sensor that detects vibration by using a piezoelectric material or the like.

The above information disclosed in this Background section is only for enhancement of understanding of the background and therefore the information discussed in this Background section does not necessarily constitute prior art.

SUMMARY

Aspects of some embodiments of the present disclosure described herein relate to a display device, and for example, relate to a display device capable of recognizing biometric information.

Aspects of some embodiments of the present disclosure include a display device having a biometric information recognition function and an input sensing function.

According to some embodiments, a display device includes a plurality of pixels and a plurality of sensors. According to some embodiments, each of the plurality of pixels includes a light emitting element and a pixel driving circuit connected to the light emitting element. According to some embodiments, each of the plurality of sensors includes a light receiving element and a sensor driving circuit connected to the light receiving element.

According to some embodiments, a sensor driving circuit included in at least one sensor among the sensors includes a reset transistor, an amplification transistor, a first output transistor, and a second output transistor.

According to some embodiments, the reset transistor includes a first electrode receiving a reset signal, a second electrode connected to a first sensing node, and a third electrode receiving a reset control signal. According to some embodiments, the amplification transistor includes a first electrode receiving a sensor driving voltage, a second electrode connected to the first sensing node, and a third electrode connected to a second sensing node. According to some embodiments, the first output transistor includes a first electrode connected to the second sensing node, a second electrode connected to a readout line, and a third electrode receiving a first output control signal. According to some embodiments, the second output transistor includes a first electrode connected to the second sensing node, a second electrode connected to the readout line, and a third electrode receiving a second output control signal.

According to some embodiments, a display device includes a display panel including a base layer, a circuit layer on the base layer, and an element layer on the circuit layer and including a light emitting element and a receiving element. According to some embodiments, the circuit layer includes a plurality of pixel driving circuits connected to the plurality of light emitting elements and a plurality of sensor driving circuits connected to the plurality of light receiving elements.

According to some embodiments, at least one of the plurality of sensor driving circuits includes a reset transistor, an amplification transistor, a first output transistor, and/or a second output transistor.

According to some embodiments, the reset transistor includes a first electrode receiving a reset signal, a second electrode connected to a first sensing node, and a third electrode receiving a reset control signal. According to some embodiments, the amplification transistor includes a first electrode receiving a sensor driving voltage, a second electrode connected to the first sensing node, and a third electrode connected to a second sensing node. According to some embodiments, the first output transistor includes a first electrode connected to the second sensing node, a second electrode connected to a readout line, and a third electrode receiving a first output control signal. According to some embodiments, the second output transistor includes a first electrode connected to the second sensing node, a second electrode connected to the readout line, and a third electrode receiving a second output control signal.

BRIEF DESCRIPTION OF THE DRAWINGS

The above and other characteristics and features of embodiments according to the present disclosure will become apparent by describing in more detail aspects of embodiments thereof with reference to the accompanying drawings.

FIG. 5 is a circuit diagram of a pixel and a sensor, according to some embodiments of the present disclosure.

FIGS. 6A and 6B are waveform diagrams for describing aspects of some example operations of the pixel and the sensor shown in FIG. 5 according to some embodiments.

FIG. 9B is a circuit diagram illustrating a pixel and a second sensor, according to some embodiments of the present disclosure.

DETAILED DESCRIPTION

Figure 1:
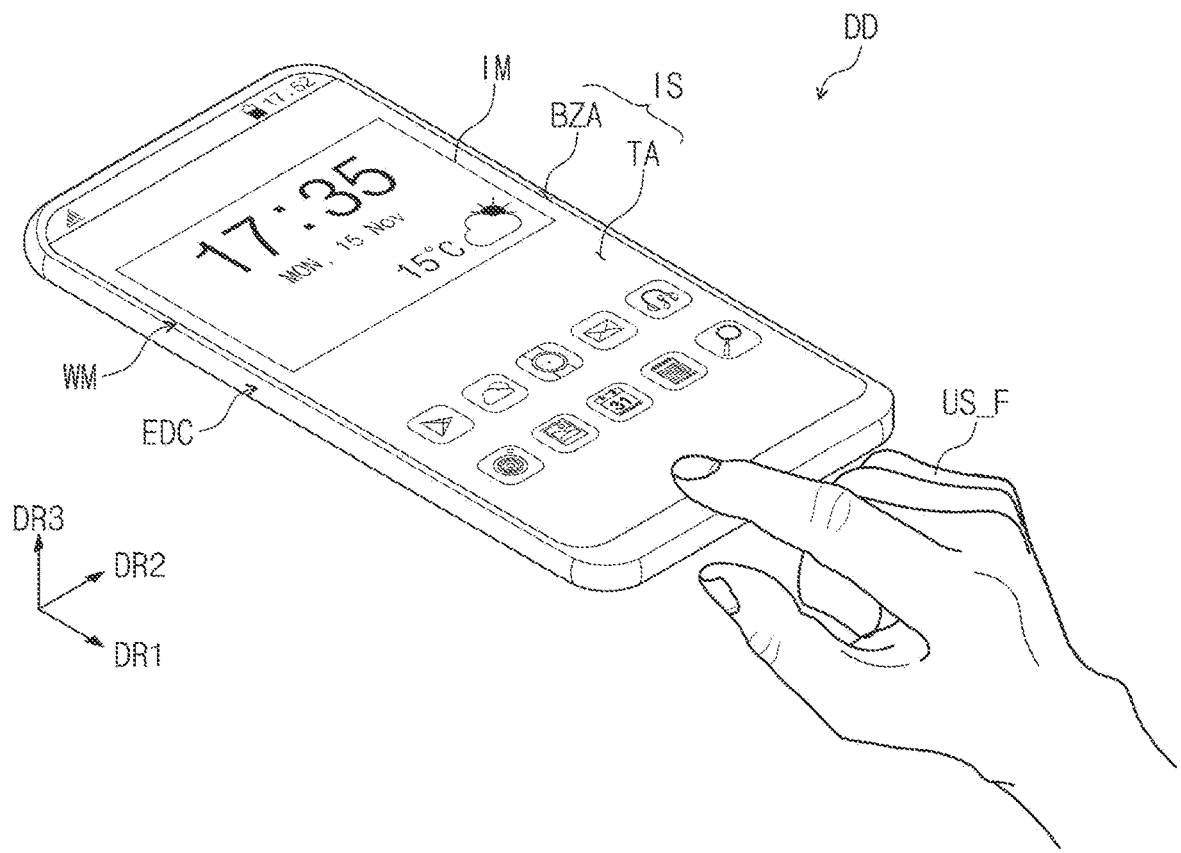
FIG. 1 is a perspective view of a display device, according to some embodiments of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, aspects of some embodiments of the present disclosure will be described in more detail with reference to accompanying drawings.

Figure 2:
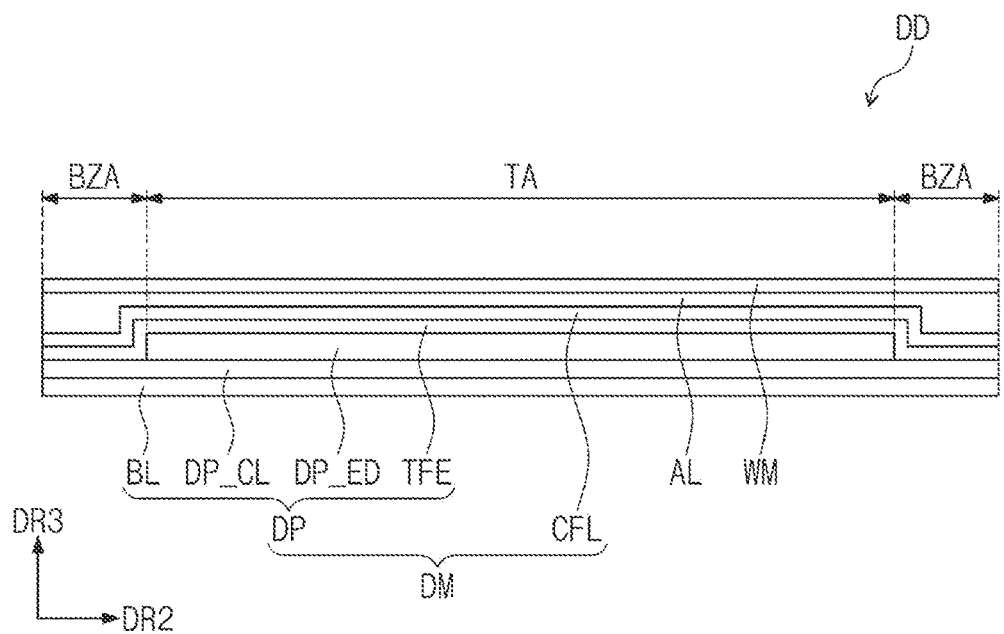
FIG. 2 is a cross-sectional view of a display device, according to some embodiments of the present disclosure.

FIG. 1 is a perspective view of a display device, according to some embodiments of the present disclosure. FIG. 2 is a cross-sectional view of a display device, according to some embodiments of the present disclosure.

Referring to FIGS. 1 and 2, a display device DD may have a rectangular shape having a long side parallel to a first direction DR1 and a short side parallel to a second direction DR2 intersecting the first direction DR1. Additionally, according to some embodiments, the display device DD may have rounded corners or square corners. However, embodiments according to the present disclosure are not limited to a generally rectangular shape, and in various embodiments the display device DD may have various shapes such as a circle or a polygon.

The display device DD may be a device activated depending on an electrical signal. The display device DD may include various embodiments. For example, the display device DD may be utilized in an electronic device such as a smart watch, a tablet PC, a notebook computer, a computer, a smart television, or the like.

Hereinafter, a normal direction substantially perpendicular to a plane defined by the first direction DR1 and the second direction DR2 is defined as a third direction DR3. In the specification, the meaning of "when viewed from above a plane" or "in a plan view" may mean "when viewed from the third direction DR3".

A top surface of the display device DD may be defined as a display surface IS, and may be parallel to a plane defined by the first direction DR1 and the second direction DR2. Images IM generated by the display device DD may be displayed to a user through a display surface IS.

The display surface IS may be divided into a transmission area TA and a bezel area BZA. The transmission area TA may be an area at which the images IM are displayed. The user visually perceives the images IM through the transmission area TA. According to some embodiments, the transmission area TA is illustrated in the shape of a quadrangle whose corners are rounded. However, this is illustrated as an example. The transmission area TA may have various shapes, and embodiments according to the present disclosure are not limited to any particular shape. For example, in some embodiments, the transmission area TA may be square, rectangular, circular, oval, a polygon, etc., without departing from the spirit and scope of embodiments according to the present disclosure.

The bezel area BZA is adjacent to (e.g., outside a footprint or in a periphery of) the transmission area TA. The bezel area BZA may have a color (e.g., a set or predetermined color). The bezel area BZA may surround the transmission area TA. Accordingly, the shape of the transmission area TA may be substantially defined by the bezel area BZA. However, this is illustrated as an example. For example, the bezel area BZA may be located adjacent to only one side of the transmission area TA or may be omitted.

The display device DD may sense an external input applied from the outside. The external input may include various types of inputs that are provided from the outside of the display device DD. For example, as well as a contact by a part of a body such as the user's hand US_F or a contact by a separate device (e.g., an active pen or a digitizer), the external input may include an external input (e.g., hovering) applied when the user's hand US_F approaches the display device DD or is adjacent to the display device DD within a distance (e.g., a set or predetermined distance). In addition, the external input may have various types such as force, pressure, temperature, light, and the like.

The display device DD may detect the user's biometric information applied from the outside. A biometric information sensing area capable of detecting the user's biometric information may be provided to the display surface IS of the display device DD. The biometric information sensing area may be provided in the entire area of the transmission area TA or may be provided in a partial area (e.g., less then then entirety) of the transmission area TA. According to some embodiments of the present disclosure, FIG. 1 illustrates that the entire transmission area TA is utilized as the biometric information sensing area.

The display device DD may include a window WM, a display module DM, and a housing EDC. According to some embodiments, an appearance of the display device DD may be implemented by coupling the window WM and the housing EDC.

A front surface of the window WM defines the display surface IS of the display device DD. The window WM may include an optically transparent insulating material. For example, the window WM may include glass or plastic. The window WM may include a multi-layer structure or a single layer structure. For example, the window WM may include a plurality of plastic films bonded to each other by an adhesive or may have a glass substrate and a plastic film bonded to each other by an adhesive.

The display module DM may include a display panel DP. The display panel DP may display images according to or based on electrical signals (e.g., image signals). The display panel DP according to some embodiments of the present disclosure may be a light emitting display panel (but embodiments according to the present disclosure are not particularly limited thereto). For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot, a quantum rod, and the like. Hereinafter, it is described that the display panel DP is an organic light emitting display panel.

Referring to FIG. 2, the display panel DP includes a base layer BL, a circuit layer DP_CL, an element layer DP_ED, and an encapsulation layer TFE. The display panel DP according to some embodiments of the present disclosure may be a flexible display panel. However, embodiments according to the present disclosure are not limited thereto. For example, the display panel DP may be a foldable display panel, which is folded with respect to a folding axis, or a rigid display panel.

The base layer BL may include a synthetic resin layer. The synthetic resin layer may be a polyimide-based resin layer, and the material thereof is not particularly limited thereto. Besides, the base layer BL may include a glass substrate, a metal substrate, an organic/inorganic composite substrate, or the like.

The circuit layer DP_CL is located on the base layer BL. The circuit layer DP_CL is interposed between the base layer BL and the element layer DP_ED. The circuit layer DP_CL includes at least one insulating layer and a circuit element. Hereinafter, the insulating layer included in the circuit layer DP_CL is referred to as an "intermediate insulating layer". The intermediate insulating layer includes at least one intermediate inorganic film and at least one intermediate organic film. The circuit element may include a pixel driving circuit, which is included in each of a plurality of pixels for displaying an image, and a sensor driving circuit, which is included in each of a plurality of sensors for recognizing external information. The external information may be touch information or biometric information.

According to some embodiments of the present disclosure, the sensor may be a touch recognition sensor, a fingerprint recognition sensor, a proximity sensor, an iris recognition sensor, or a blood pressure measurement sensor. Furthermore, the sensor may be an optical sensor that recognizes the biometric information in an optical scheme. The circuit layer DP_CL may further include signal lines connected to the pixel driving circuit and/or the sensor driving circuit.

The element layer DP_ED may include a light emitting element included in each of the pixels and a light receiving element included in each of the sensors. According to some embodiments of the present disclosure, the light receiving element may be a photodiode. The light receiving element may be a sensor that detects or responds to light reflected by a user's fingerprint. The element layer DP_ED will be described in more detail later with reference to FIGS. 11A and 11B.

The encapsulation layer TFE encapsulates the element layer DP_ED. The encapsulation layer TFE may include at least one organic film and at least one inorganic film. The inorganic film may include inorganic materials and may protect the element layer DP_ED from moisture/oxygen. The inorganic film may include a silicon nitride layer, a silicon oxynitride layer, a silicon oxide layer, a titanium oxide layer, an aluminum oxide layer, or the like, but not limited particularly thereto. The organic film may include organic materials and may protect the element layer DP_ED from foreign objects such as dust particles.

The display module DM may further include a color filter layer CFL. According to some embodiments of the present disclosure, the color filter layer CFL may be located on the display panel DP. According to some embodiments of the present disclosure, the color filter layer CFL may be directly located on the encapsulation layer TFE. The color filter layer CFL may include a plurality of color filters and a black matrix. Details of the structure of the color filter layer CFL will be described later.

The display device DD according to some embodiments of the present disclosure may further include an adhesive layer AL. The window WM may be attached to the color filter layer CFL by the adhesive layer AL. The adhesive layer AL may include an optical clear adhesive, an optically clear adhesive resin, or a pressure sensitive adhesive (PSA).

The housing EDC is coupled to the window WM. The housing EDC is coupled to the window WM to provide an inner space (e.g., a set or predetermined inner space). The display module DM may be accommodated in the inner space. The housing EDC may include a material having relatively high rigidity. For example, the housing EDC may include glass, plastic, or metal or may include a plurality of frames and/or plates that are composed of a combination thereof. The housing EDC may stably protect configurations of the display device DD accommodated in the inner space from an external impact. According to some embodiments, a battery module for supplying power required for overall operations of the display device DD may be interposed between the display module DM and the housing EDC.

Figure 3:
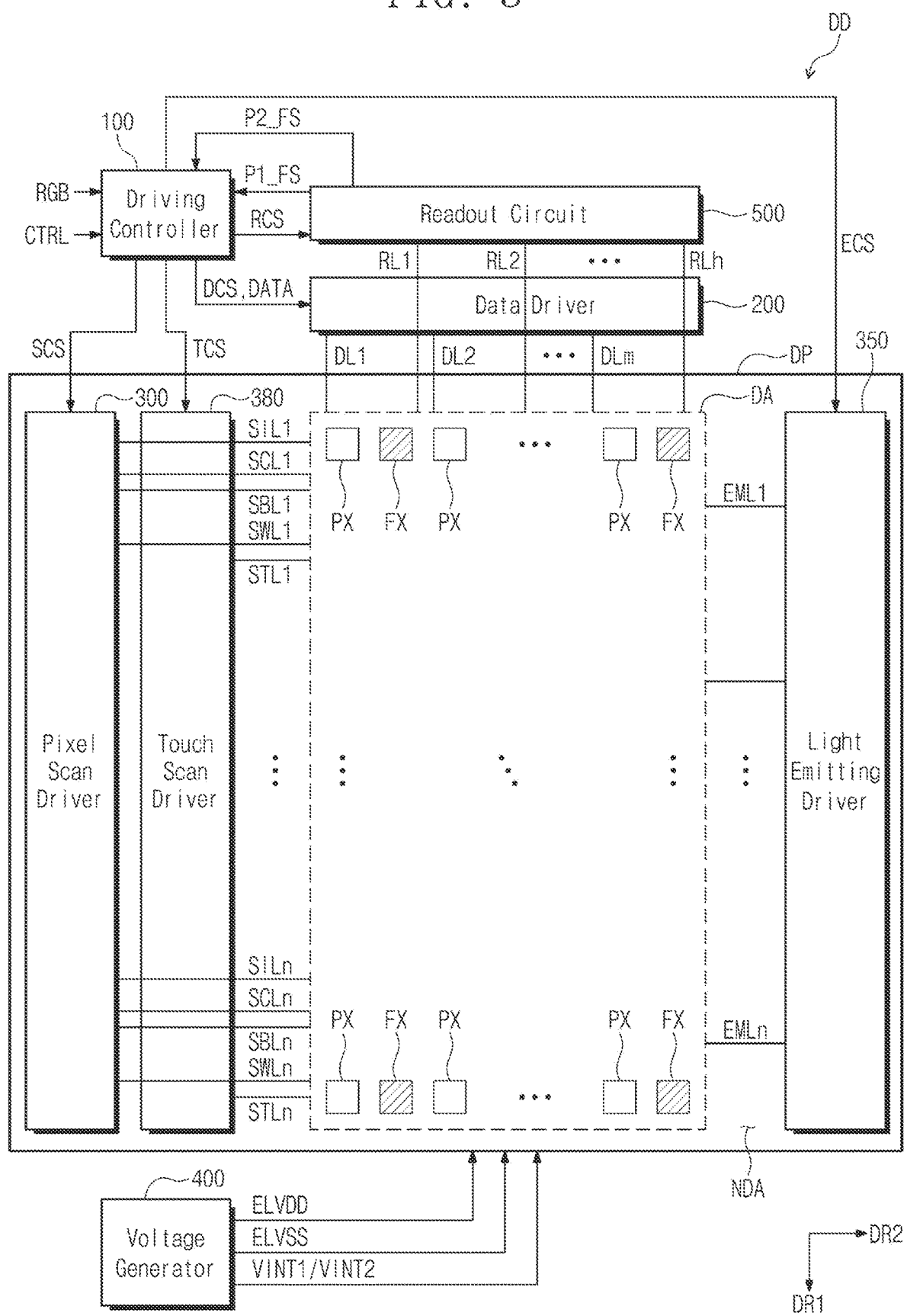
FIG. 3 is a block diagram of a display device, according to some embodiments of the present disclosure.
Figure 4:
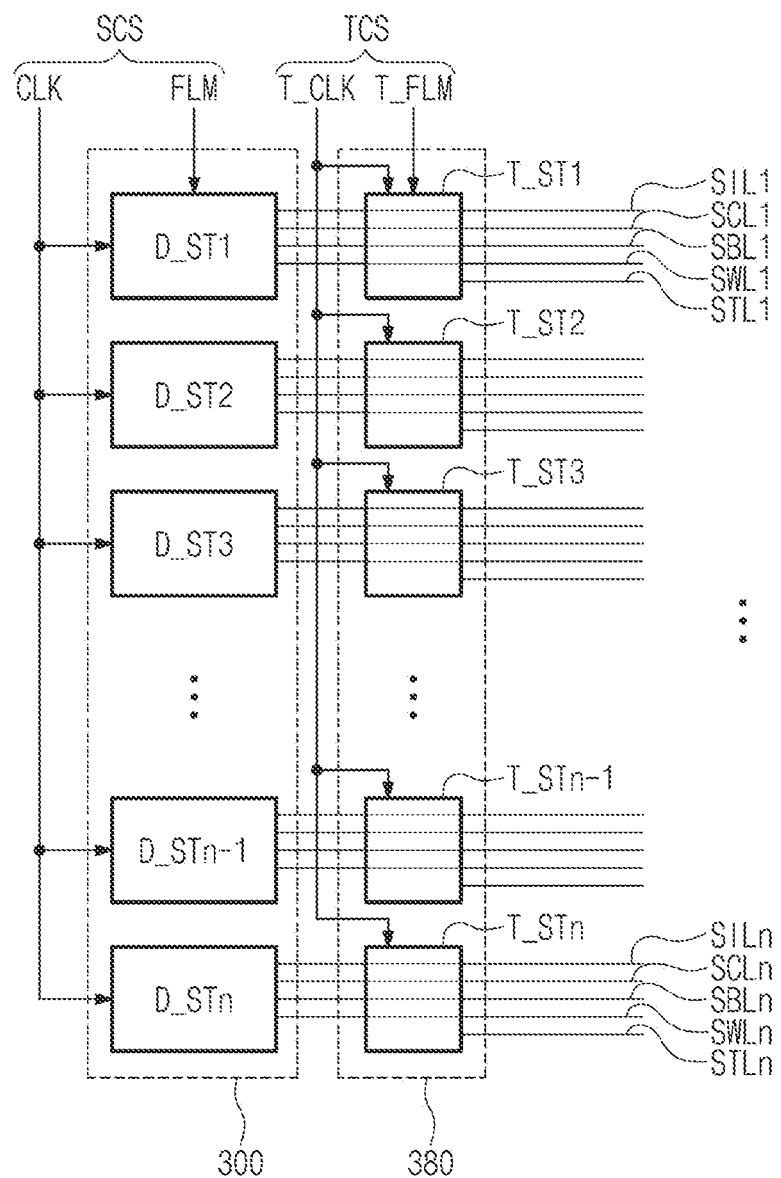
FIG. 4 is an internal block diagram showing further details of a pixel scan driver and a touch scan driver shown in FIG. 3 according to some embodiments of the present disclosure.

FIG. 3 is a block diagram of a display device, according to some embodiments of the present disclosure. FIG. 4 is an internal block diagram of a pixel scan driver and a touch scan driver shown in FIG. 3.

Referring to FIG. 3, the display device DD includes the display panel DP, a panel driver, and a driving controller 100. According to some embodiments of the present disclosure, the panel driver includes a data driver 200, a pixel scan driver 300, a light emitting driver 350, a touch scan driver 380, a voltage generator 400, and a readout circuit 500.

The driving controller 100 receives an image signal RGB and a control signal CTRL. The driving controller 100 generates image data DATA by converting a data format of the image signal RGB in compliance with the specification for an interface with the data driver 200. The driving controller 100 outputs a first control signal SCS, a second control signal ECS, a third control signal DCS, a fourth control signal RCS and a fifth control signal TCS.

The data driver 200 receives the third control signal DCS and the image data DATA from the driving controller 100. The data driver 200 converts the image data DATA into data signals and outputs the data signals to a plurality of data lines DL1 to DLm to be described later. The data signals refer to analog voltages corresponding to grayscale values of the image data DATA.

The pixel scan driver 300 receives the first control signal SCS from the driving controller 100. The pixel scan driver 300 may output scan signals to scan lines to be described in more detail later in response to the first control signal SCS.

The touch scan driver 380 receives the fifth control signal TCS from the driving controller 100. The touch scan driver 380 may output touch scan signals to touch scan lines STL1 to STLn to be described later in response to the fifth control signal TCS.

The voltage generator 400 generates voltages necessary to operate the display panel DP. According to some embodiments, the voltage generator 400 generates a first driving voltage ELVDD, a second driving voltage ELVSS, a first initialization voltage VINT1, and a second initialization voltage VINT2.

The display panel DP may include a display area DA corresponding to the transmission area TA (as illustrated in FIG. 1) and a non-display area NDA corresponding to the bezel area BZA (as illustrated in FIG. 1).

The display panel DP may include a plurality of pixels PX located in the display area DA and a plurality of sensors FX located in the display area DA. According to some embodiments of the present disclosure, each of the plurality of sensors FX may be interposed between two pixels PX adjacent to each other. The plurality of pixels PX and the plurality of sensors FX may be alternately located on a plane defined in the first and second directions DR1 and DR2. However, embodiments according to the present disclosure are not limited thereto. That is, the two or more pixels PX may be positioned between the two sensors FX adjacent to each other in the first direction DR1 among the plurality of sensors FX. Alternatively, the two or more pixels PX may be positioned between the two sensors FX adjacent to each other in the second direction DR2 among the plurality of sensors FX.

The display panel DP further includes initialization scan lines SIL1 to SILn, compensation scan lines SCL1 to SCLn, write scan lines SWL1 to SWLn, black scan lines SBL1 to SBLn, emission control lines EML1 to EMLn, touch scan lines STL1 to STLn, data lines DL1 to DLm, and readout lines RL1 to RLh. The initialization scan lines SIL1 to SILn, the compensation scan lines SCL1 to SCLn, the write scan lines SWL1 to SWLn, the black scan lines SBL1 to SBLn, the touch scan lines STL1 to STLn, and the emission control lines EML1 to EMLn extend in the second direction DR2. The initialization scan lines SIL1 to SILn, the compensation scan lines SCL1 to SCLn, the write scan lines SWL1 to SWLn, the black scan lines SBL1 to SBLn, the touch scan lines STL1 to STLn, and the emission control lines EML1 to EMLn are arranged spaced from one another in the first direction DR1. The data lines DL1 to DLm and the readout lines RL1 to RLh extend in the first direction DR1 and are arranged spaced from one another in the second direction DR2.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, the touch scan lines STL1 to STLn, and the data lines DL1 to DLm. For example, each of the plurality of pixels PX may be electrically connected to four scan lines (e.g., a corresponding initialization scan line, a corresponding compensation scan line, a corresponding write scan line, and a corresponding black scan line). However, the number of scan lines connected to each of the pixels PX is not limited to thereto and may be changed.

The plurality of sensors FX may be electrically connected to the initialization scan lines SIL1 to SILn, the compensation scan lines SCL1 to SCLn, the black scan lines SBL1 to SBLn, the touch scan lines STL1 to STLn, and the readout lines RL1 to RLh. Each of the plurality of sensors FX may be electrically connected to three corresponding scan lines (e.g., a corresponding initialization scan line, a corresponding compensation scan line, and a corresponding black scan line). However, embodiments according to the present disclosure are not limited thereto. The number of scan lines connected to each of the sensors FX may be changed. Alternatively, each of the plurality of sensors FX may be electrically connected to one corresponding scan line (e.g., a corresponding black scan line). The sensors FX may be formed directly on the display area DA of the display panel DP at the same time as the pixels PX through a thin film process of forming the pixels PX.

The number of the readout lines RL1 to RLh may be less than or equal to the number of the data lines DL1 to DLm. For example, the number of the readout lines RL1 to RLh may correspond to ½, ¼, or ⅛ of the number of the data lines DL1 to DLm.

Referring to FIGS. 3 and 4, the pixel scan driver 300 and the touch scan driver 380 may be located in the non-display area NDA of the display panel DP. According to some embodiments of the present disclosure, the pixel scan driver 300 and the touch scan driver 380 may be directly formed on the non-display area NDA of the display panel DP through a thin film process of forming the pixels PX.

The pixel scan driver 300 receives the first control signal SCS from the driving controller 100. In response to the first control signal SCS, the pixel scan driver 300 outputs initialization scan signals to the initialization scan lines SIL1 to SILn and outputs compensation scan signals to the compensation scan lines SCL1 to SCLn. Furthermore, in response to the first control signal SCS, the pixel scan driver 300 may output write scan signals to the write scan lines SWL1 to SWLn and may output black scan signals to the black scan lines SBL1 to SBLn. Alternatively, the pixel scan driver 300 may include a first scan driver and a second scan driver. The first scan driver may output the initialization scan signals and the compensation scan signals. The second scan driver may output the write scan signals and the black scan signals.

The pixel scan driver 300 may include a plurality of driving stages D_ST1, D_ST2, D_ST3 to D_STn−1, and D_STn (e.g., 'n' driving stages). Here, 'n' may be a natural number of 2 or more. When the pixel scan driver 300 includes a first scan driver and a second scan driver, the first scan driver may include a plurality of first driving stages, and the second scan driver may include a plurality of second driving stages.

The driving stages D_ST1 to D_STn receive the first control signal SCS from the driving controller 100. The first control signal SCS may include a driving start signal FLM and a driving clock signal CLK. The driving start signal FLM may be supplied to the first driving stage D_ST1 among the driving stages D_ST1 to D_STn. Each of the driving stages D_ST1 to D_STn may receive the driving clock signal CLK. According to some embodiments of the present disclosure, the driving clock signal CLK may include two or more clock signals having different phases from each other. Each of the driving stages D_ST1 to D_STn further receives a gate-on voltage and a gate-off voltage. The gate-on voltage and the gate-off voltage may be provided from the voltage generator 400.

The touch scan driver 380 may include a plurality of touch stages T_ST1, T_ST2, T_ST3 to T_STn−1, and T_STn (e.g., 'n' touch stages). Here, 'n' may be a natural number of 2 or more. The plurality of touch stages T_ST1 to T_STn receives the fifth control signal TCS from the driving controller 100. The fifth control signal TCS may include a touch start signal T_FLM and a touch clock signal T_CLK. The touch start signal T_FLM may be supplied to the first touch stage T_ST1 among the plurality of touch stages T_ST1 to T_STn. Each of the plurality of touch stages T_ST1 to T_STn may receive the touch clock signal T_CLK. The touch clock signal T_CLK may include two or more clock signals having different phases from each other. Each of the touch stages T_ST1 to T_STn further receives the gate-on voltage and the gate-off voltage.

The touch scan driver 380 sequentially outputs touch scan signals to the touch scan lines STL1 to STLn in response to the fifth control signal TCS. Alternatively, the touch scan lines STL1 to STLn may be divided into a plurality of groups (e.g., 'k' groups (here, 'k' is an integer greater than or equal to 1)). In this case, the plurality of groups may sequentially receive touch scan signals, and touch scan lines included in each group may simultaneously (or concurrently) receive corresponding touch scan signals.

According to some embodiments of the present disclosure, the touch scan driver 380 may be activated in an input detection mode for recognizing touch information and the like, and may be deactivated in a biometric information recognition mode for recognizing biometric information. That is, in the biometric information recognition mode, the touch scan driver 380 may output touch scan signals having an inactive state (e.g., a high level). In input detection mode, the touch scan driver 380 may output touch scan signals having a partially active state (e.g., a low level).

The light emitting driver 350 may be located in the non-display area NDA of the display panel DP. The light emitting driver 350 receives the second control signal ECS from the driving controller 100. The light emitting driver 350 may output emission control signals to the emission control lines EML1 to EMLn in response to the second control signal ECS. Alternatively, the pixel scan driver 300 may be connected to the emission control lines EML1 to EMLn. In this case, the light emitting driver 350 may be omitted, and the pixel scan driver 300 may output the emission control signals to the emission control lines EML1 to EMLn.

The readout circuit 500 receives the fourth control signal RCS from the driving controller 100. The readout circuit 500 may receive first detection signals and second detection signals from the readout lines RL1 to RLh in response to the fourth control signal RCS. The first detection signals may be signals including biometric information (e.g., a fingerprint, etc.) detected through the sensors FX. The second detection signals may be signals including information about an external input (e.g., a contact with a part of the user's body, such as a finger, or a contact with a separate device, such as a stylus) detected through the sensors FX.

The readout circuit 500 processes the first detection signals received from the readout lines RL1 to RLh and then generates a first processed detection signal P1_FS. The readout circuit 500 processes the second detection signals received from the readout lines RL1 to RLh and then generates a second processed detection signal P2_FS. The readout circuit 500 may provide the first and second processed detection signals P1_FS and P2_FS to the driving controller 100. According to some embodiments of the present disclosure, a sensor controller may be mounted in the driving controller 100. Accordingly, the driving controller 100 may recognize the biometric information based on the first processed detection signals P1_FS. Moreover, the driving controller 100 may generate coordinate information about an external input based on the second processed detection signals P2_FS. However, embodiments according to the present disclosure are not limited thereto. Alternatively, the sensor controller may be provided in a configuration independent of the driving controller 100. In this case, the first and second processed detection signals P1_FS and P2_FS output from the readout circuit 500 may not be provided to the driving controller 100 but may be provided to the sensor controller.

Figure 6A:
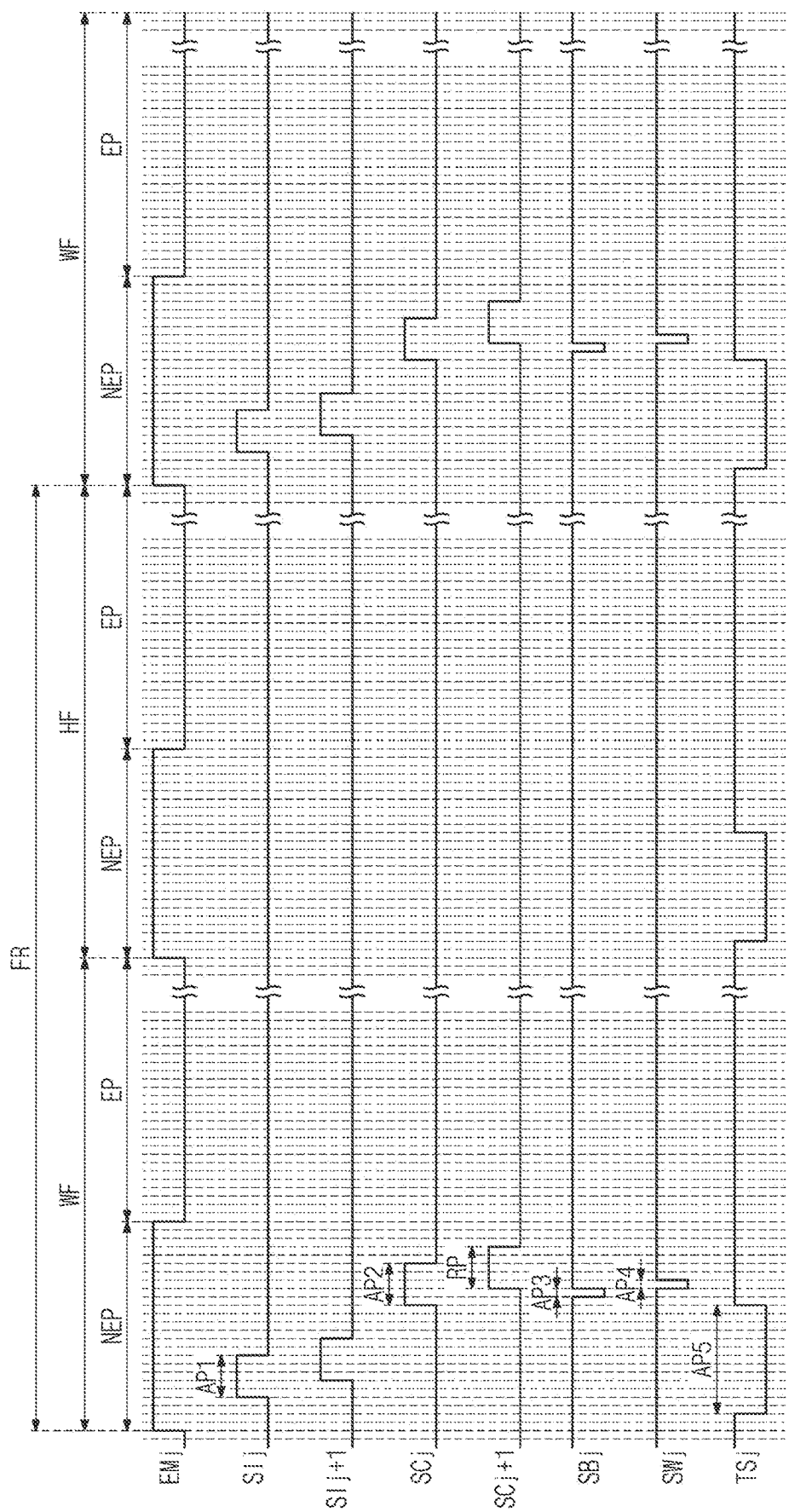

FIG. 5 is a circuit diagram of a pixel and a sensor, according to some embodiments of the present disclosure. FIGS. 6A and 6B are waveform diagrams for describing operations of a pixel and a sensor shown in FIG. 5.

FIG. 5 illustrates an equivalent circuit diagram of a single pixel PXij among the pixels PX illustrated in FIG. 3. Because each of the plurality of pixels PX has the same circuit structure, a detailed description of the remaining pixels will be replaced with a description of a circuit structure of the pixel PXij. Moreover, FIG. 5 shows an equivalent circuit diagram of one sensor FXij among the plurality of sensors FX shown in FIG. 3. Because each of the plurality of sensors FX has the same circuit structure, the detailed description of the remaining pixels will be replaced with a description of a circuit structure for the sensor FXij.

Referring to FIG. 5, the pixel PXij is connected with an i-th data line DLi of the data lines DL1 to DLm, a j-th initialization scan line SILj of the initialization scan lines SIL1 to SILn, a j-th compensation scan line SCLj of the compensation scan lines SCL1 to SCLn, a j-th write scan line SWLj of the write scan lines SWL1 to SWLn, a j-th black scan line SBLj of the black scan lines SBL1 to SBLn, and a j-th emission control line EMLj of the emission control lines EML1 to EMLn.

The pixel PXij includes a light emitting element ED and a pixel driving circuit PDC. The light emitting element ED may be a light emitting diode. According to some embodiments of the present disclosure, the light emitting element ED may be an organic light emitting diode including an organic light emitting layer.

The pixel driving circuit PDC includes first to fifth transistors T1, T2, T3, T4, and T5, first and second emission control transistors ET1 and ET2, and one capacitor Cst. At least one of the first to fifth transistors T1, T2, T3, T4, or T5 and the first and second emission control transistors ET1 and ET2 may be a transistor having a low-temperature polycrystalline silicon (LTPS) semiconductor layer. Some of the first to fifth transistors T1, T2, T3, T4, and T5 and the first and second emission control transistors ET1 and ET2 may be P-type transistors, and the others thereof may be N-type transistors. For example, the first, second, and fifth transistors T1, T2, and T5 and the first and second emission control transistors ET1 and ET2 are P-type transistors, and the third and fourth transistors T3 and T4 may be N-type transistors. At least one of the first to fifth transistors T1, T2, T3, T4, or T5 and the first and second emission control transistors ET1 and ET2 may be a transistor having an oxide semiconductor layer. For example, the third and fourth transistors T3 and T4 may be oxide semiconductor transistors, and the first, second, and fifth transistors T1, T2, and T5 and the first and second emission control transistors ET1 and ET2 may be LTPS transistors.

A configuration of the pixel driving circuit PDC according to some embodiments of the present disclosure is not limited to the embodiments illustrated in FIG. 5. The pixel driving circuit PDC illustrated in FIG. 5 is only an example. For example, the configuration of the pixel driving circuit PDC may be modified and implemented to include additional components or fewer components without departing from the spirit and scope of embodiments according to the present disclosure. Each of the first to fifth transistors T1, T2, T3, T4, and T5 and the first and second emission control transistors ET1 and ET2 may be a P-type transistor or an N-type transistor.

The j-th initialization scan line SILj, the j-th compensation scan line SCLj, the j-th write scan line SWLj, the j-th black scan line SBLj, and the j-th emission control line EMLj may transfer a j-th initialization scan signal Slj, a j-th compensation scan signal SCj, a j-th write scan signal SWj, a j-th black scan signal SBj, and a j-th emission control signal EMj to the pixel PXij, respectively. The i-th data line DLi transfers an i-th data signal Di to the pixel PXij. The i-th data signal Di may have a voltage level corresponding to the image signal RGB (see FIG. 3) input to the display device DD (see FIG. 3).

First and second driving voltage lines VL1 and VL2 may transfer the first and second driving voltages ELVDD and ELVSS to the pixel PXij, respectively. Also, first and second initialization voltage lines VL3 and VL4 may transfer the first and second initialization voltages VINT1 and VINT2 to the pixel PXij, respectively.

The first transistor T1 is connected between the first driving voltage line VL1 receiving the first driving voltage ELVDD and the light emitting element ED. The first transistor T1 includes a first electrode connected to the first driving voltage line VL1 via the first emission control transistor ET1, a second electrode connected to the light emitting element ED (e.g., an anode electrode) via the second emission control transistor ET2, and a third electrode (e.g., a gate electrode) connected to one end (e.g., a first node N1) of the capacitor Cst. The first transistor T1 may receive the data signal Di transferred through the i-th data line DLi depending on a switching operation of the second transistor T2 and then may supply a driving current Id to the light emitting element ED.

The second transistor T2 is connected between the i-th data line DLi and the first electrode of the first transistor T1. The second transistor T2 includes a first electrode connected with the i-th data line DLi, a second electrode connected with the first electrode of the first transistor T1, and a third electrode (e.g., a gate electrode) connected with the j-th write scan line SWLj. The second transistor T2 may be turned on in response to the j-th write scan signal SWj transferred through the j-th write scan line SWLj and then may transfer the i-th data signal Di transferred from the i-th data line DLi to the first electrode of the first transistor T1.

The third transistor T3 is connected between the second electrode of the first transistor T1 and the first node N1. The third transistor T3 includes a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on in response to the j-th compensation scan signal SCj (e.g., a first scan signal) transferred through the j-th compensation scan line SCLj and may connect the third electrode and the second electrode of the first transistor T1. In this case, the first transistor T1 may be diode-connected.

The fourth transistor T4 is connected between the first node N1 and the first initialization voltage line VL3 through which the first initialization voltage VINT1 is applied. The fourth transistor T4 includes a first electrode connected to the first initialization voltage line VL3 through which the first initialization voltage VINT1 is supplied, a second electrode connected to the first node N1, and a third electrode (e.g., a gate electrode) connected to the j-th initialization scan line SILj. The fourth transistor T4 is turned on in response to the j-th initialization scan signal Slj (e.g., a second scan signal) transferred through the j-th initialization scan line SILj. The fourth transistor T4 thus turned on may transfer the first initialization voltage VINT1 to the first node N1 such that a potential of the third electrode of the first transistor T1 (i.e., a potential of the first node N1) is initialized.

The first emission control transistor ET1 includes a first electrode connected with the first driving voltage line VL1, a second electrode connected with the first electrode of the first transistor T1, and a third electrode (e.g., a gate electrode) connected with the j-th emission control line EMLj.

The second emission control transistor ET2 includes a first electrode connected to the second electrode of the first transistor T1, a second electrode connected to the light emitting element ED (e.g., an anode electrode), and a third electrode (e.g., a gate electrode) connected to j-th emission control line EMLj.

The first and second emission control transistors ET1 and ET2 are simultaneously (or concurrently) turned on in response to the j-th emission control signal EMj transferred through the j-th emission control line EMLj. The first driving voltage ELVDD applied through the first emission control transistor ET1 thus turned on may be compensated through the diode-connected transistor T1 and then may be transferred to the light emitting element ED.

The fifth transistor T5 includes a first electrode connected to the second initialization voltage line VL4 through which the second initialization voltage VINT2 is supplied, a second electrode connected to the second electrode of the second emission control transistor ET2, and a third electrode (e.g., a gate electrode) connected to the j-th black scan line SBLj. A voltage level of the second initialization voltage VINT2 may lower than or equal to that of the first initialization voltage VINT1. The fifth transistor T5 is turned on in response to the j-th black scan signal SBj (e.g., a third scan signal) received through the j-th black scan line SBLj. The fifth transistor T5 thus turned on delivers the second initialization voltage VINT2 to the anode electrode of the light emitting element ED to initialize a potential of the anode electrode.

As described above, one end of the capacitor Cst is connected with the third electrode of the first transistor T1, and the other end of the capacitor Cst is connected with the first driving voltage line VL1. A cathode electrode of the light emitting element ED may be connected with the second driving voltage line VL2 that transfers the second driving voltage ELVSS. A voltage level of the second driving voltage ELVSS may be lower than a voltage level of the first driving voltage ELVDD. According to some embodiments of the present disclosure, the voltage level of the second driving voltage ELVSS may be lower than the voltage level of each of the first and second initialization voltages VINT1 and VINT2.

Referring to FIGS. 5 and 6A, the j-th emission control signal EMj may have a high level during a non-emission period NEP and may have a low level during an emission period EP. During the non-emission period NEP, the j-th initialization scan signal Slj is activated. During an activation period AP1 (hereinafter, referred to as a "first activation period") of the j-th initialization scan signal Slj, when the j-th initialization scan signal Slj of a high level is provided through the j-th initialization scan line SILj, the fourth transistor T4 is turned on in response to the j-th initialization scan signal Slj of the high level. The first initialization voltage VINT1 is transferred to the third electrode of the first transistor T1 via the fourth transistor T4 thus turned on, and the first node N1 is initialized to the first initialization voltage VINT1. Accordingly, the first activation period AP1 may be defined as an initialization period of the pixel PXij.

Next, the j-th compensation scan signal SCj is activated, and the third transistor T3 is turned on when the j-th compensation scan signal SCj of the high level is supplied through the j-th compensation scan line SCLj during an activation period AP2 (hereinafter, referred to as a "second activation period") of the j-th compensation scan signal SCj. The first transistor T1 is diode-connected by the third transistor T3 thus turned on to be forward-biased. According to some embodiments of the present disclosure, the first activation period AP1 may not overlap the second activation period AP2.

The j-th write scan signal SWj is activated within the second activation period AP2. The j-th write scan signal SWj has a low level during an activation period AP4 (hereinafter, referred to as a "fourth activation period"). During the fourth activation period AP4, the second transistor T2 is turned on in response to the j-th write scan signal SWj of the low level. In this case, a compensation voltage "Di–Vth" is applied to the third electrode of the first transistor T1. Here, the compensation voltage "Di–Vth" may correspond to a result of subtracting a threshold voltage Vth of the first transistor T1 from a voltage of the i-th data signal Di supplied from the i-th data line DLi. That is, a potential of the third electrode of the first transistor T1 may be the compensation voltage "Di–Vth". According to some embodiments of the present disclosure, the fourth activation period AP4 may overlap the second activation period AP2. The duration of the second activation period AP2 may be greater than the duration of the fourth activation period AP4.

The first driving voltage ELVDD and the compensation voltage "Di–Vth" may be respectively applied to opposite ends of the capacitor Cst, and charges corresponding to a voltage difference between the opposite ends of the capacitor Cst may be stored in the capacitor Cst. Here, a high level period (i.e., the second activation period AP2) of the j-th compensation scan signal SCj may be referred to as a "compensation section of the pixel PXij".

In the meantime, the j-th black scan signal SBj is activated within the second activation period AP2 of the j-th compensation scan signal SCj. The j-th black scan signal SBj has a low level during the activation period AP3 (hereinafter, referred to as a "third activation period"). During the third activation period AP3, the fifth transistor T5 is turned on by receiving the j-th black scan signal SBj of a low level through the j-th black scan line SBLj. A portion of the driving current Id may be drained through the fifth transistor T5 as a bypass current Ibp. The third activation period AP3 may overlap the second activation period AP2. The duration of the second activation period AP2 may be greater than the duration of the third activation period AP3. The third activation period AP3 may precede the fourth activation period AP4, and may not overlap the fourth activation period AP4.

In the case where the pixel PXij displays a black image, when the light emitting element ED emits light even though the minimum driving current of the first transistor T1 flows as the driving current Id, the pixel PXij may not normally display a black image. Accordingly, the fifth transistor T5 in the pixel PXij according to some embodiments of the present disclosure may drain (or disperse) a part of the minimum driving current of the first transistor T1 to a current path, which is different from a current path to the light emitting element ED, as the bypass current Ibp. Here, the minimum driving current of the first transistor T1 means the current flowing into the first transistor T1 under the condition that the first transistor T1 is turned off because the gate-source voltage Vgs of the first transistor T1 is less than the threshold voltage Vth. As the minimum driving current (e.g., a current of about 10 pA or less) flowing to the first transistor T1 is transferred to the light emitting element ED under the condition that the first transistor T1 is turned off, an image of a black gray scale is displayed. When the pixel PXij displays a black image, the bypass current Ibp has a relatively large influence on the minimum driving current. On the other hand, when the pixel PXij displays an image such as a normal image or a white image, the bypass current Ibp has little effect on the driving current Id. Accordingly, when a black image is displayed, a current (i.e., the light emitting current Ied) that corresponds to a result of subtracting the bypass current Ibp flowing through the fifth transistor T5 from the driving current Id is provided to the light emitting element ED, and thus a black image may be clearly displayed. Accordingly, the pixel PXij may implement an accurate black grayscale image by using the fifth transistor T5, and thus a contrast ratio may be improved.

Next, the j-th emission control signal EMj that is supplied from the j-th emission control line EMLj transitions from the high level to the low level. During the emission period EP, the first and second emission control transistors ET1 and ET2 are turned on in response to the emission control signal EMj of a low level. In this case, because a difference is present between the voltage of the third electrode of the first transistor T1 and the first driving voltage ELVDD, the driving current Id is generated. The driving current Id thus generated is supplied to the light emitting element ED through the second emission control transistor ET2, and thus, a current Ied flows through the light emitting element ED.

Returning to FIG. 5, the sensor FXij is connected to a d-th readout line RLd among the readout lines RL1 to RLh, the j-th compensation scan line SCLj, the j-th initialization scan line SILj, and the j-th touch scan line STLj.

The sensor FXij includes a light receiving element OPD and a sensor driving circuit SDC. The light receiving element OPD may be a photodiode. According to some embodiments of the present disclosure, the light receiving element OPD may be an organic photodiode including an organic material as a photoelectric conversion layer. FIG. 5 shows that the sensor FXij includes the one light receiving element OPD, but embodiments according to the present disclosure are not limited thereto. For example, the sensor FXij may include a plurality of light receiving elements connected in parallel. In this case, a plurality of light receiving elements may be commonly connected to one sensor driving circuit SDC.

An anode electrode of the light receiving element OPD may be connected to a first sensing node SN1. A cathode electrode of the light receiving element OPD may be connected to the second driving voltage line VL2 that delivers the second driving voltage ELVSS. The cathode electrode of the light receiving element OPD may be electrically connected to the cathode electrode of the light emitting element ED. According to some embodiments of the present disclosure, the cathode electrode of the light receiving element OPD may be integrated with the cathode electrode of the light emitting element ED to form a common cathode electrode.

The sensor driving circuit SDC includes four transistors ST1 to ST4. The four transistors ST1 to ST4 may be a reset transistor ST1, an amplification transistor ST2, a first output transistor ST3, and a second output transistor ST4, respectively. At least one of the reset transistor ST1, the amplification transistor ST2, the first output transistor ST3, or the second output transistor ST4 may be an oxide semiconductor transistor. According to some embodiments of the present disclosure, the reset transistor ST1 may be an oxide semiconductor transistor, and the amplification transistor ST2, the first output transistor ST3, and the second output transistor ST4 may be LTPS transistors. However, embodiments according to the present disclosure are not limited thereto. The reset transistor ST1 and the second output transistor ST4 may be oxide semiconductor transistors, and the amplification transistor ST2 and the first output transistor ST3 may be LTPS transistors.

Furthermore, some of the reset transistor ST1, the amplification transistor ST2, the first output transistors ST3, and the second output transistor ST4 may be P-type transistors, and the other(s) thereof may be N-type transistors. The reset transistor ST1 and the first output transistor ST3 may be different types of transistors from each other, and the first and second output transistors ST3 and ST4 may be the same type of transistors as each other. According to some embodiments of the present disclosure, the amplification transistor ST2, the first output transistor ST3, and the second output transistor ST4 may be PMOS transistors, and the reset transistor ST1 may be an NMOS transistor. However, embodiments according to the present disclosure are not limited thereto. For example, all of the reset transistor ST1, the amplification transistor ST2, the first output transistor ST3, and the second output transistor ST4 may be N-type transistors or P-type transistors.

According to some embodiments of the present disclosure, a part (e.g., the reset transistor ST1) of the reset transistor ST1, the amplification transistor ST2, the first output transistor ST3, and the second output transistor ST4 may be a transistor having the same type as each of the third and fourth transistors T3 and T4 of the pixel PXij. The type of each of the amplification transistor ST2 and the output transistor ST3 may be the same as that of each of the first, second, and fifth transistors T1, T2, and T5 and the first and second emission control transistors ET1 and ET2 of the pixel PXij. Alternatively, the reset transistor ST1 and the second output transistor ST4 may have the same type as the third and fourth transistors T3 and T4 of the pixel PXij. In this case, the first and second output transistors ST3 and ST4 may be composed of different types of transistors from each other.

The circuit configuration of the sensor driving circuit SDC according to some embodiments of the present disclosure is not limited to that illustrated in FIG. 5. The sensor driving circuit SDC illustrated in FIG. 5 is only an example, and the configuration of the sensor driving circuit SDC may be modified and implemented.

The reset transistor ST1 includes a first electrode configured to receive a reset signal, a second electrode connected with the first sensing node SN1, and a third electrode configured to receive a reset control signal. The reset transistor ST1 may reset a potential of the first sensing node SN1 to the reset signal in response to the reset control signal. The reset control signal may be a (j+1)-th compensation scan signal SCj+1 supplied through a (j+1)-th compensation scan line SCLj+1. That is, the reset transistor ST1 may receive the (j+1)-th compensation scan signal SCj+1 supplied from the (j+1)-th compensation scan line SCLj+1 as the reset control signal. Alternatively, the reset control signal may be a signal provided through a separate reset control line.

At least during an activation period (i.e., a reset period RP) of the reset control signal, the reset signal may have a voltage level lower than the second driving voltage ELVSS. According to some embodiments of the present disclosure, the reset transistor ST1 may receive a (j+1)-th initialization scan signal SIj+1 supplied from a (j+1)-th initialization scan line as the reset signal. During the reset period RP, the (j+1)-th initialization scan signal SIj+1 may have a voltage level lower than the second driving voltage ELVSS. Alternatively, the reset signal may be a DC voltage provided through a separate reset voltage line and maintained at a voltage level lower than the second driving voltage ELVSS.

When the reset transistor ST1 is turned on in response to the (j+1)-th compensation scan signal SCj+1 during the reset period RP, the first sensing node SN1 may be reset in response to the reset signal (e.g., a low level of the (j+1)-th initialization scan signal SIj+1). Accordingly, the activation period (e.g., a high level period) of the (j+1)-th compensation scan signal SCj+1 may be defined as the reset period RP of the sensor FXij.

The reset transistor ST1 may include a plurality of sub-reset transistors connected to one another in series. For example, the reset transistor ST1 may include two sub-reset transistors (hereinafter referred to as "first and second sub-reset transistors"). In this case, the third electrode of the first sub-reset transistor and the third electrode of the second sub-reset transistor receive the reset control signal. Also, a second electrode of the first sub-reset transistor and a first electrode of the second sub-reset transistor may be electrically connected with each other.

Also, the reset signal may be applied to a first electrode of the first sub-reset transistor, and a second electrode of the second sub-reset transistor may be electrically connected with the first sensing node SN1. However, the number of sub-reset transistors is not limited thereto and may be variously changed or modified.

The amplification transistor ST2 includes a first electrode receiving a sensing driving voltage SLVD, a second electrode connected with the second sensing node SN2, and a third electrode connected with the first sensing node SN1. The amplification transistor ST2 is turned on in response to the potential of the first sensing node SN1 to apply the sensing driving voltage SLVD to the second sensing node SN2. According to some embodiments of the present disclosure, the sensing driving voltage SLVD may correspond to one of the first driving voltage ELVDD, the first initialization voltage VINT1, and the second initialization voltage VINT2. When the sensing driving voltage SLVD corresponds to the first driving voltage ELVDD, the first electrode of the amplification transistor ST2 may be electrically connected with the first driving voltage line VL1. When the sensing driving voltage SLVD corresponds to the first initialization voltage VINT1, the first electrode of the amplification transistor ST2 may be electrically connected with the first initialization voltage line VL3. When the sensing driving voltage SLVD corresponds to the second initialization voltage VINT2, the first electrode of the amplification transistor ST2 may be electrically connected with the second initialization voltage line VL4.

The first output transistor ST3 includes a first electrode connected to the second sensing node SN2, a second electrode connected to the d-th readout line RLd, and a third electrode receiving a first output control signal. The first output transistor ST3 may deliver a first detection signal F_FSd (e.g., a fingerprint detection signal) to the d-th readout line RLd in response to the first output control signal. According to some embodiments of the present disclosure, the first output control signal may be the j-th black scan signal SBj that is supplied through the j-th black scan line SBLj. That is, the first output transistor ST3 may receive the j-th black scan signal SBj provided from the j-th black scan line SBLj as the first output control signal.

The second output transistor ST4 includes a first electrode connected to the second sensing node SN2, a second electrode connected to the d-th readout line RLd, and a third electrode receiving a second output control signal. The second output transistor ST4 may deliver a second detection signal T_FSd (e.g., a touch detection signal) to the d-th readout line RLd in response to the second output control signal. According to some embodiments of the present disclosure, the second output control signal may be a j-th touch scan signal TSj supplied through a j-th touch scan line STLj. That is, the second output transistor ST4 may receive the j-th touch scan signal TSj supplied from the j-th touch scan line STLj as the second output control signal. The activation period of the second output control signal may not overlap with the activation period of the first output control signal. That is, the first and second output control signals are not simultaneously (or concurrently) activated, and thus the first and second output transistors ST3 and ST4 may not be simultaneously (or concurrently) turned on.

As shown in FIGS. 6A and 6B, the j-th touch scan signal TSj may have a low level during a fifth activation period AP5. However, the present disclosure is not limited thereto. When the second output transistor ST4 is composed of an NMOS transistor, the j-th touch scan signal TSj may have a high level during the fifth activation period AP5. The fifth activation period AP5 of the j-th touch scan signal TSj may not overlap with the third activation period AP3 of the j-th black scan signal SBj. Alternatively, when the first output transistor ST3 receives the j-th write scan signal SWj as the first output control signal, the j-th touch scan signal TSj of the fifth activation period AP5 may not overlap with the fourth activation period AP4 of the j-th write scan signal SWj.

The light receiving element OPD of the sensor FXij may be exposed to light during the emission period EP of the light emitting element ED. The light may be light output from a pixel having a specific color (e.g., green color) among a plurality of pixels PX.

When a user's hand US_F (see FIG. 1) touches the display surface IS (see FIG. 1) in a biometric information detection mode, the light receiving element OPD generates photocharges corresponding to light reflected by a ridge or valley between ridges of a fingerprint. The amount of current flowing through the light receiving element OPD is changed by the generated photocharges. When the light receiving element OPD receives the light reflected by the ridge of the fingerprint, the current flowing through the light receiving element OPD may be referred to as a "first current". When the light receiving element OPD receives the light reflected by the valley of the fingerprint, the current flowing through the light receiving element OPD may be referred to as a "second current".

Because there is a difference in light intensity between light reflected by the fingerprint's ridge and light reflected by the fingerprint's valley, the difference in light intensity is a difference between the first and second currents. When the first current flows through the light receiving element OPD, a potential of the first sensing node SN1 may be referred to as a "first potential". When the second current flows through the light receiving element OPD, a potential of the first sensing node SN1 may be referred to as a "second potential". According to some embodiments of the present disclosure, the first current may be greater than the second current. In this case, the first potential may be lower than the second potential.

The amplification transistor ST2 may be a source follower amplifier generating a source-drain current in proportion to the potential of the first sensing node SN1 input to the third electrode of the amplification transistor ST2.

During the third activation period AP3 (e.g., a fingerprint sensing period), the j-th black scan signal SBj of a low level is supplied to the first output transistor ST3 through the j-th black scan line SBLj. When the first output transistor ST3 is turned on in response to the j-th black scan signal SBj having a low level, the first detection signal F_FSd corresponding to a current flowing through the amplification transistor ST2 may be output to the d-th readout line RLd.

In an input detection mode, the light receiving element OPD located at a point where the user's hand US_F is touched generates photocharges corresponding to the light reflected by the user's hand. On the other hand, because the reflected light is not incident on the light receiving element OPD located at a point where the user's hand US_F is not touched, photocharges are not generated.

Accordingly, the current flows by the generated photocharges into the light receiving element OPD located at a touched point where the user's hand US_F is touched. On the other hand, no current or relatively little current may flow into the light receiving element OPD located at an untouched point where the user's hand US_F is not touched. A difference in the amount of current between the light receiving element OPD located at the touched point and the light receiving element OPD located at the untouched point may be reflected to the first sensing node SN1 of each the sensor driving circuit SDC. A potential of the first sensing node SN1 at the touched point may be referred to as a "third potential". A potential of the first sensing node SN1 at the untouched point may be referred to as a "fourth potential". According to some embodiments of the present disclosure, the third potential may be lower than the fourth potential. The amount of current output from the amplification transistor ST2 varies depending on a potential of the first sensing node SN1.

During the fifth activation period AP5 (e.g., a touch sensing period), the j-th touch scan signal TSj of a low level is supplied to the second output transistor ST4 through the j-th touch scan line STLj. When the second output transistor ST4 is turned on in response to the j-th touch scan signal TSj of a low level, the second detection signal T_FSd corresponding to a current flowing through the amplification transistor ST2 may be output to the d-th readout line RLd.

That is, when the first output transistor ST3 is turned on (i.e., during the fingerprint sensing period), a signal output to the d-th readout line RLd is referred to as the "first detection signal F_FSd". When the second output transistor ST4 is turned on (i.e. during the touch sensing period), a signal output to the d-th readout line RLd is referred to as the "second detection signal T_FSd". The first and second detection signals F_FSd and T_FSd output to the d-th readout line RLd may be provided to the readout circuit 500. The readout circuit 500 may process the first and second detection signals F_FSd and T_FSd in different schemes.

Next, when the (j+1)-th compensation scan signal SCj+1 of a high level is supplied as a reset control signal during the reset period RP, the reset transistor ST1 is turned on. The reset period RP may be defined as the activation period of the (j+1)-th compensation scan signal SCj+1. Alternatively, when the reset transistor ST1 is composed of a PMOS transistor, the reset control signal RST of a low level may be supplied during the reset period RP. During the reset period RP, the first sensing node SN1 may be reset to a potential corresponding to the reset signal (e.g., the (j+1)-th initialization scan signal SIj+1 having a low level). According to some embodiments of the present disclosure, the reset signal may have a lower voltage level than the second driving voltage ELVSS.

When the reset period RP ends, the light receiving element OPD generates photocharges corresponding to the received light, and the generated photocharges may be accumulated in the first sensing node SN1.

Referring to FIGS. 5 to 6B, the display panel DP (see FIG. 3) may display an image for a plurality of frames FR. Each of the frames FR includes a write frame WF and a holding frame HF. The write frame WF may be a frame in which emission control signals and scan signals are activated. The holding frame HF may be a frame in which emission control signals are activated but scan signals are deactivated. For example, an activation period of each of the j-th initialization scan signal SIj, the (j+1)-th initialization scan signal SIj+1, the j-th compensation scan signal SCj, the (j+1)-th compensation scan signal SCj+1, the j-th write scan signal SWj, and the j-th black scan signal SBj overlaps with the write frame WF and may not overlap with the holding frame. In other words, during the holding frame HF, the j-th initialization scan signal SIj, the (j+1)-th initialization scan signal SIj+1, the j-th compensation scan signal SCj, the (j+1)-th compensation scan signal SCj+1, the j-th write scan signal SWj, and the j-th black scan signal SBj may maintain non-activation states. The activation period (i.e., the emission period EP) of the j-th emission control signal EMj may overlap the write frame WF and the holding frame HF. In this case, the j-th emission control signal EMj may be generated at twice the frequency of the scan signals SIj, SIj+1, SCj, SCj+1, SBj, and SWj. For example, when the j-th emission control signal EMj of 240 Hz is generated, the scan signals SIj, SIj+1, SCj, SCj+1, SBj, and SWj may be generated to have 120 Hz. However, the present disclosure is not limited thereto. As shown in FIG. 6B, some scan signals (e.g., the j-th black scan signal SBj) among the scan signals SIj, SIj+1, SCj, SCj+1, SBj, and SWj have the same frequency (e.g., 240 Hz) as the j-th emission control signal EMj.

The fifth activation period AP5 of the j-th touch scan signal TSj may overlap the write frame WF and the holding frame HF. In this case, the j-th touch scan signal TSj may be generated to have a higher frequency (e.g., a frequency greater than the scan signals by an integer multiple) than the scan signals SIj, SIj+1, SCj, SCj+1, SBj, and SWj. According to some embodiments of the present disclosure, the j-th touch scan signal TSj may be generated to have the same frequency (e.g., 240 Hz) as the j-th emission control signal EMj. Accordingly, during the write frame WF, the first and second detection signals F_FSd and T_FSd may be output through the d-th readout line RLd. However, during the holding frame HF, only the second detection signal T_FSd may be output through the d-th readout line RLd.

As shown in FIGS. 3 to 6B, when the sensors FX have the same circuit configuration as one another, issues such as image quality imbalance may not occur because the circuit arrangement is uniform throughout the display area DA.

Figure 7:
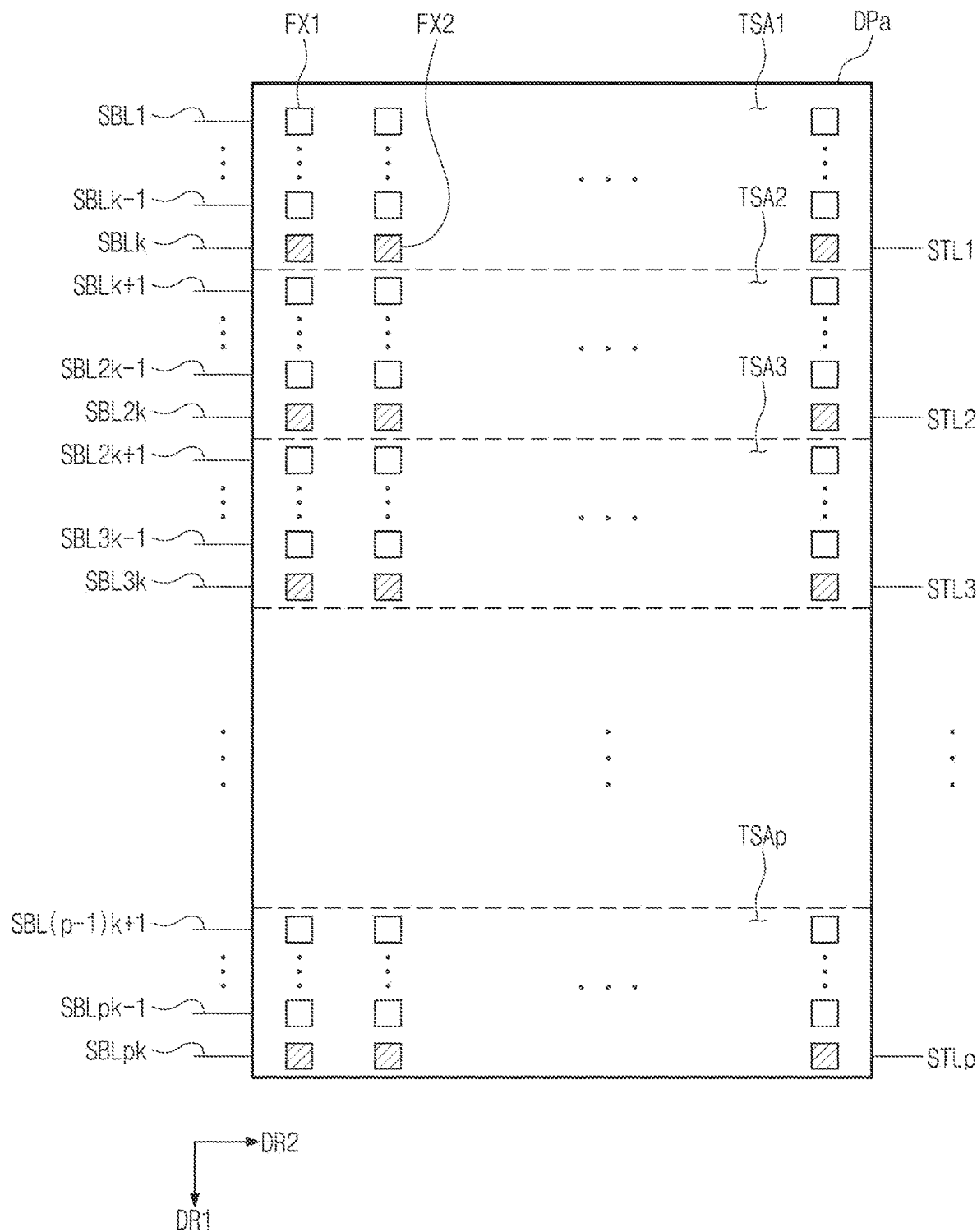
FIG. 7 is a plan view of a display panel, according to some embodiments of the present disclosure.
Figure 8:
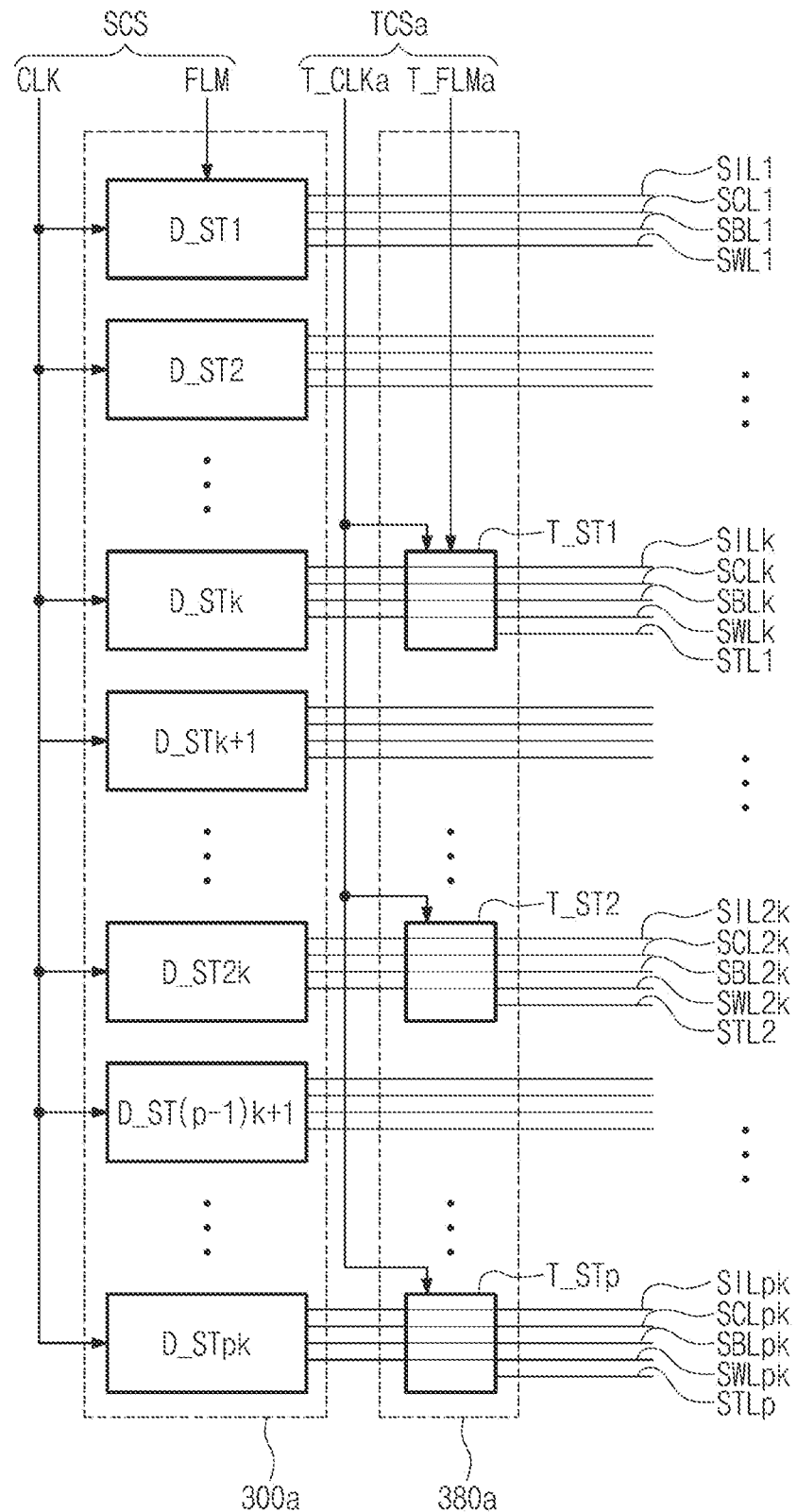
FIG. 8 is an internal block diagram of a pixel scan driver and a touch scan driver, according to some embodiments of the present disclosure.

FIG. 7 is a plan view of a display panel, according to some embodiments of the present disclosure. FIG. 8 is an internal block diagram of a pixel scan driver and a touch scan driver, according to some embodiments of the present disclosure.

Referring to FIGS. 7, a display panel DPa according to some embodiments of the present disclosure includes a plurality of touch sensing areas TSA1, TSA2, and TSA3 to TSAp. The plurality of touch sensing areas TSA1 to TSAp may be arranged in the first direction DR1. One or more touch scan lines STL1, STL2, and STL3 to STLp may be provided in each of the plurality of touch sensing areas TSA1 to TSAp. According to some embodiments of the present disclosure, it is shown that the touch scan lines STL1 to STLp are respectively arranged in the touch sensing areas TSA1 to TSAp, but the present disclosure is not limited thereto. Two or more touch scan lines may be provided in each of the touch sensing areas TSA1 to TSAp.

'k' black scan lines SBL1 to SBLk, SBLk+1 to SBL2k, SBL2k+1 to SBL3k, and SBL(p−1)k+1 to SBLpk may be arranged in the touch sensing areas TSA1 to TSAp. For convenience of description, FIG. 7 shows only the 'k' black scan lines SBL1 to SBLk, the 'k' black scan lines SBLk+1 to SBL2k, the 'k' black scan lines SBL2k+1 to SBL3k, and the 'k' black scan lines SBL(p−1)k+1 to SBLpk. However, 'k' initialization scan lines, 'k' compensation scan lines, and 'k' write scan lines may be further arranged in each of the touch sensing areas TSA1 to TSAP. Here, 'k' may be an integer of 2 or more.

A first sensor FX1 and a second sensor FX2 may be positioned in each of the touch sensing areas TSA1 to TSAp. The first sensor FX1 may refer to a sensor not connected to a touch scan line, and the second sensor FX2 may refer to a sensor connected to the touch scan line. The first sensor FX1 may have a first circuit configuration, and the second sensor FX2 may have a second circuit configuration different from the first circuit configuration. The configurations of the first and second circuits will be described in more detail later with reference to FIGS. 9A and 9B.

'k−1' first sensors FX1 are positioned between the two second sensors FX2 adjacent to each other in the first direction DR1. However, the present disclosure is not limited thereto. Alternatively, the 'k−1' first sensors FX1 may be positioned between the two second sensors FX2 adjacent to each other in the second direction DR2.

Referring to FIG. 8, a pixel scan driver 300a may include a plurality of driving stages D_ST1, D_ST2 to D_STk, and D_STk+1 to D_STpk (e.g., 'n' driving stages). According to some embodiments of the present disclosure, a first group D_ST1 to D_STk among the plurality of driving stages D_ST1 to D_STpk is positioned to correspond to the first touch sensing area TSA1. A second group D_STk+1 to D_ST2k among the plurality of driving stages D_ST1 to D_STpk is positioned to correspond to the second touch sensing area TSA2. A p-th group D_ST(p−1)k+1 to D_STpk among the plurality of driving stages D_ST1 to D_STpk is positioned to correspond to the p-th touch sensing area TSAp.

The driving stages D_ST1 to D_STpk receive the first control signal SCS from the driving controller 100. The first control signal SCS may include a driving start signal FLM and a driving clock signal CLK. The driving start signal FLM may be supplied to the first driving stage D_ST1 among the driving stages D_ST1 to D_STpk. Each of the driving stages D_ST1 to D_STn may receive the driving clock signal CLK. According to some embodiments of the present disclosure, the driving clock signal CLK may include two or more clock signals having different phases from each other.

In response to the first control signal SCS, the pixel scan driver 300a outputs initialization scan signals to initialization scan lines SIL1 to SILpk and outputs compensation scan signals to compensation scan lines SCL1 to SCLpk. Moreover, in response to the first control signal SCS, the pixel scan driver 300a may output write scan signals to write scan lines SWL1 to SWLpk and may output black scan signals to black scan lines SBL1 to SBLpk.

The touch scan driver 380a may include a plurality of touch stages T_ST1 and T_ST2 to T_STp (e.g., 'p' touch stages). Here, 'p' is an integer greater than or equal to 2, and 'n' is an integer greater than 'p'. According to some embodiments of the present disclosure, 'n' may be an integer 'k' times greater than 'p'. The plurality of touch stages T_ST1 to T_STp receives a fifth control signal TCSa from the driving controller 100. The fifth control signal TCSa may include a touch start signal T_FLMa and a touch clock signal T_CLKa. The touch start signal T_FLMa may be supplied to the first touch stage T_ST1 among the plurality of touch stages T_ST1 to T_STp. Each of the plurality of touch stages T_ST1 to T_STp may receive the touch clock signal T_CLKa. The touch clock signal T_CLKa may include two or more clock signals having different phases from each other.

According to some embodiments of the present disclosure, the plurality of touch stages T_ST1 to T_STp may be respectively positioned to correspond to the plurality of touch sensing area TSA1 to TSAp illustrated in FIG. 7. The first touch stage T_ST1 among the plurality of touch stages T_ST1 to T_STp may be arranged adjacent to the k-th driving stage D_STk among the plurality of driving stages D_ST1 to D_STpk, and the second touch stage T_ST2 among the plurality of touch stages T_ST1 to T_STp may be arranged adjacent to the 2k-th driving stage D_ST2k among the plurality of driving stages D_ST1 to D_STpk. The last p-th touch stage T_STp among the plurality of touch stages T_ST1 to T_STp may be arranged adjacent to the last pk-th driving stage D_STpk among the plurality of driving stages D_ST1 to D_STpk. However, the present disclosure is not limited thereto. Alternatively, the first touch stage T_ST1 among the plurality of touch stages T_ST1 to T_STp may be arranged adjacent to one of the first driving stage D_ST1 to the k-th driving stage D_STk among the plurality of driving stages D_ST1 to D_STpk. The second touch stage T_ST2 among the plurality of touch stages T_ST1 to T_STp may be arranged adjacent to one of the (k+1)-th driving stage to 2k-th driving stage D_ST2k among the plurality of driving stages D_ST1 to D_STpk.

The touch scan driver 380a sequentially outputs touch scan signals to the touch scan lines STL1 to STLp in response to the fifth control signal TCSa.

Figure 9A:
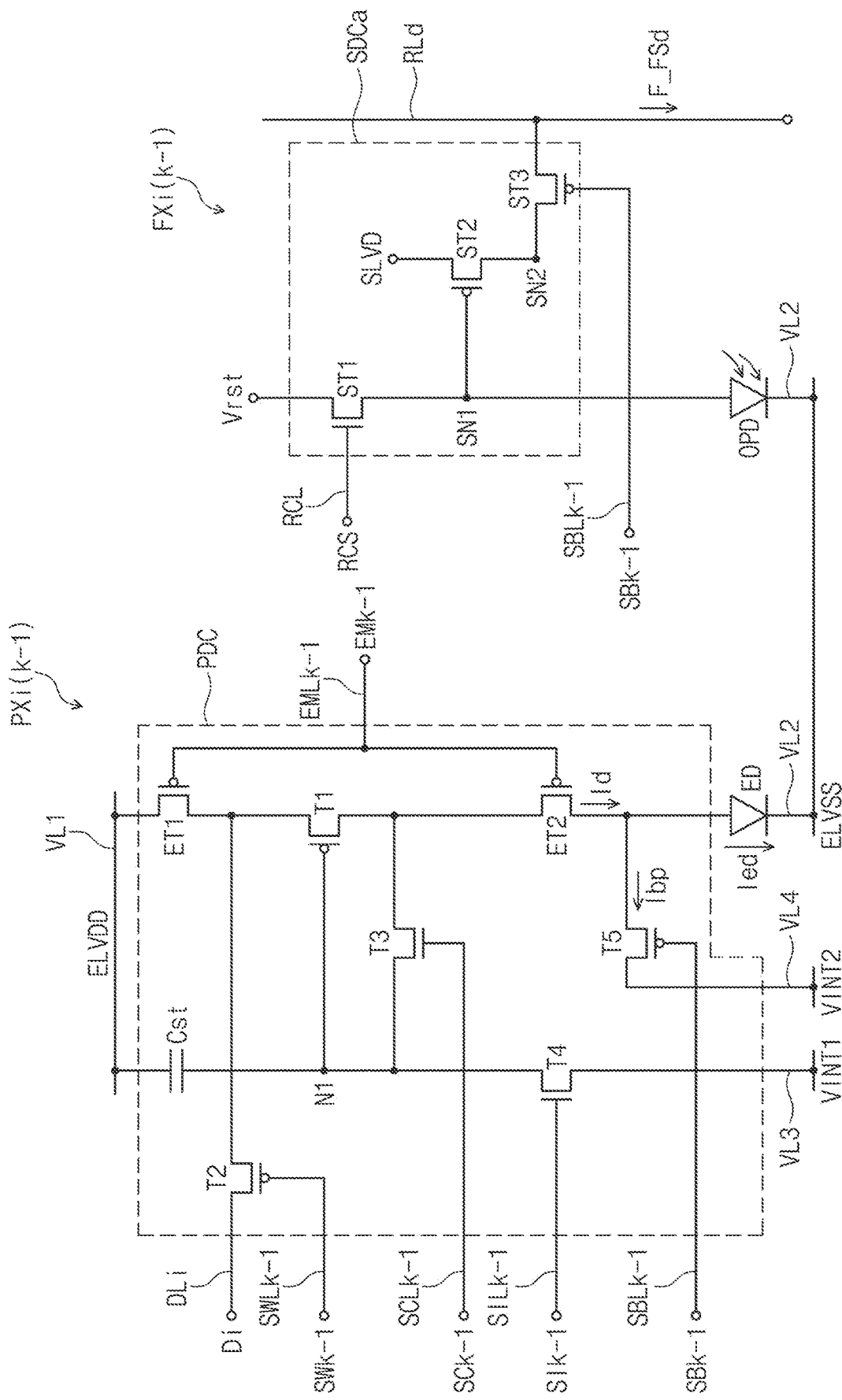
FIG. 9A is a circuit diagram illustrating a pixel and a first sensor, according to some embodiments of the present disclosure.

FIG. 9A is a circuit diagram illustrating a pixel and a first sensor, according to some embodiments of the present disclosure. FIG. 9B is a circuit diagram illustrating a pixel and a second sensor, according to some embodiments of the present disclosure. FIG. 9A shows a circuit diagram showing a circuit configuration of a (i(k−1))-th pixel PXi(k−1) positioned in the first touch sensing area TSA1 (see FIG. 7) and a (i(k−1))-th sensor FXi(k−1) (i.e., the first sensor FX1 (see FIG. 7)) positioned in the first touch sensing area TSA1. FIG. 9B shows a circuit diagram showing a circuit configuration of an ik-th pixel PXik positioned in the first touch sensing area TSA1 and an ik-th sensor FXik (i.e., the second sensor FX2 (see FIG. 7)) positioned in the first touch sensing area TSA1.

However, in describing components shown in FIGS. 9A and 9B, the same reference numerals are given to the same components as those shown in FIG. 5, and thus a detailed description thereof will be omitted to avoid redundancy.

Referring to FIG. 9A, the (i(k−1))-th sensor FXi(k−1) (i.e., the first sensor FX1) is connected to the d-th readout line RLd among the readout lines RL1 to RLh, a reset control line RCL, and the (k−1)-th black scan line SBLk−1.

The sensor FXi(k−1) includes the light receiving element OPD and a first sensor driving circuit SDCa. An anode electrode of the light receiving element OPD may be connected to the first sensing node SN1. A cathode electrode of the light receiving element OPD may be connected to the second driving voltage line VL2 that delivers the second driving voltage ELVSS. The cathode electrode of the light receiving element OPD may be electrically connected to the cathode electrode of the light emitting element ED.

The first sensor driving circuit SDCa includes three transistors ST1 to ST3. The three transistors ST1 to ST3 may include the reset transistor ST1, the amplification transistor ST2, and the first output transistor ST3. At least one of the reset transistor ST1, the amplification transistor ST2, or the first output transistor ST3 may be an oxide semiconductor transistor. According to some embodiments of the present disclosure, the reset transistor ST1 may be an oxide semiconductor transistor, and the amplification transistor ST2 and the first output transistor ST3 may be LTPS transistors.

The reset transistor ST1 includes a first electrode receiving a reset voltage Vrst, a second electrode connected to the first sensing node SN1, and a third electrode receiving a reset control signal RCS. The reset transistor ST1 may reset a potential of the first sensing node SN1 to the reset voltage Vrst in response to the reset control signal RCS. The reset control signal RCS may be a signal provided through the reset control line RCL. The reset voltage Vrst may be a voltage supplied from the voltage generator 400 (see FIG. 3). The reset voltage Vrst may be lower than a voltage level of the second driving voltage ELVSS.

The amplification transistor ST2 and the first output transistor ST3 may have the same configuration as the amplification transistor ST2 and the first output transistor ST3 shown in FIG. 5.

Because the (i(k−1))-th sensor FXi(k−1) does not include the second output transistor ST4, the (i(k−1))-th sensor FXi(k−1) only outputs the first detection signal F_FSd in response to the (k−1)-th black scan signal SBk−1, and does not output the second detection signal T_FSd (see FIG. 9B).

Referring to FIG. 9B, the ik-th sensor FXik (i.e., the second sensor FX2) is connected to the d-th readout line RLd among the readout lines RL1 to RLh, the reset control line RCL, the k-th black scan line SBLk, and the first touch scan line STL1.

The sensor FXik includes the light receiving element OPD and a second sensor driving circuit SDCb. An anode electrode of the light receiving element OPD may be connected to a first sensing node SN1. A cathode electrode of the light receiving element OPD may be connected to the second driving voltage line VL2 that delivers the second driving voltage ELVSS. The cathode electrode of the light receiving element OPD may be electrically connected to the cathode electrode of the light emitting element ED.

The second sensor driving circuit SDCb includes four transistors ST1 to ST4. The four transistors ST1 to ST4 may be the reset transistor ST1, the amplification transistor ST2, the first output transistor ST3, and the second output transistor ST4, respectively. At least one of the reset transistor ST1, the amplification transistor ST2, the first output transistor ST3, or the second output transistor ST4 may be an oxide semiconductor transistor. According to some embodiments of the present disclosure, the reset transistor ST1 may be an oxide semiconductor transistor, and the amplification transistor ST2 and the first output transistor ST3 may be LTPS transistors.

The reset transistor ST1 includes a first electrode receiving the reset voltage Vrst, a second electrode connected to the first sensing node SN1, and a third electrode receiving a reset control signal RCS. The reset transistor ST1 may reset a potential of the first sensing node SN1 to the reset voltage Vrst in response to the reset control signal RCS. The reset control signal RCS may be a signal provided through the reset control line RCL. The reset voltage Vrst may be a voltage supplied from the voltage generator 400 (see FIG. 3). The reset voltage Vrst may be lower than a voltage level of the second driving voltage ELVSS.

The amplification transistor ST2, the first output transistor ST3, and the second output transistor ST4 may have the same configuration as the amplification transistor ST2, the first output transistor ST3, and the second output transistor ST4 shown in FIG. 5.

The ik-th sensor FXik may include the second output transistor ST4, and thus the ik-th sensor FXik may output the first detection signal F_FSd in response to the k-th black scan signal SBk and may output the second detection signal T_FSd in response to the first touch scan signal TS1.

As shown in FIGS. 7 to 9B, although the first and second sensors FX1 and FX2 have different circuit configurations from each other, the light receiving element OPD of the first sensor FX1 and the light receiving element OPD of the second sensor FX2 may be arranged in the same shape as each other. In other words, the first and second sensors FX1 and FX2 may have different structures from each other in the circuit layer DP_CL (see FIG. 2) where the first and second sensor driving circuits SDCa and SDCb are arranged. However, within the element layer DP_ED (see FIG. 2), the first and second sensors FX1 and FX2 may have the same structure as each other.

Figure 10:
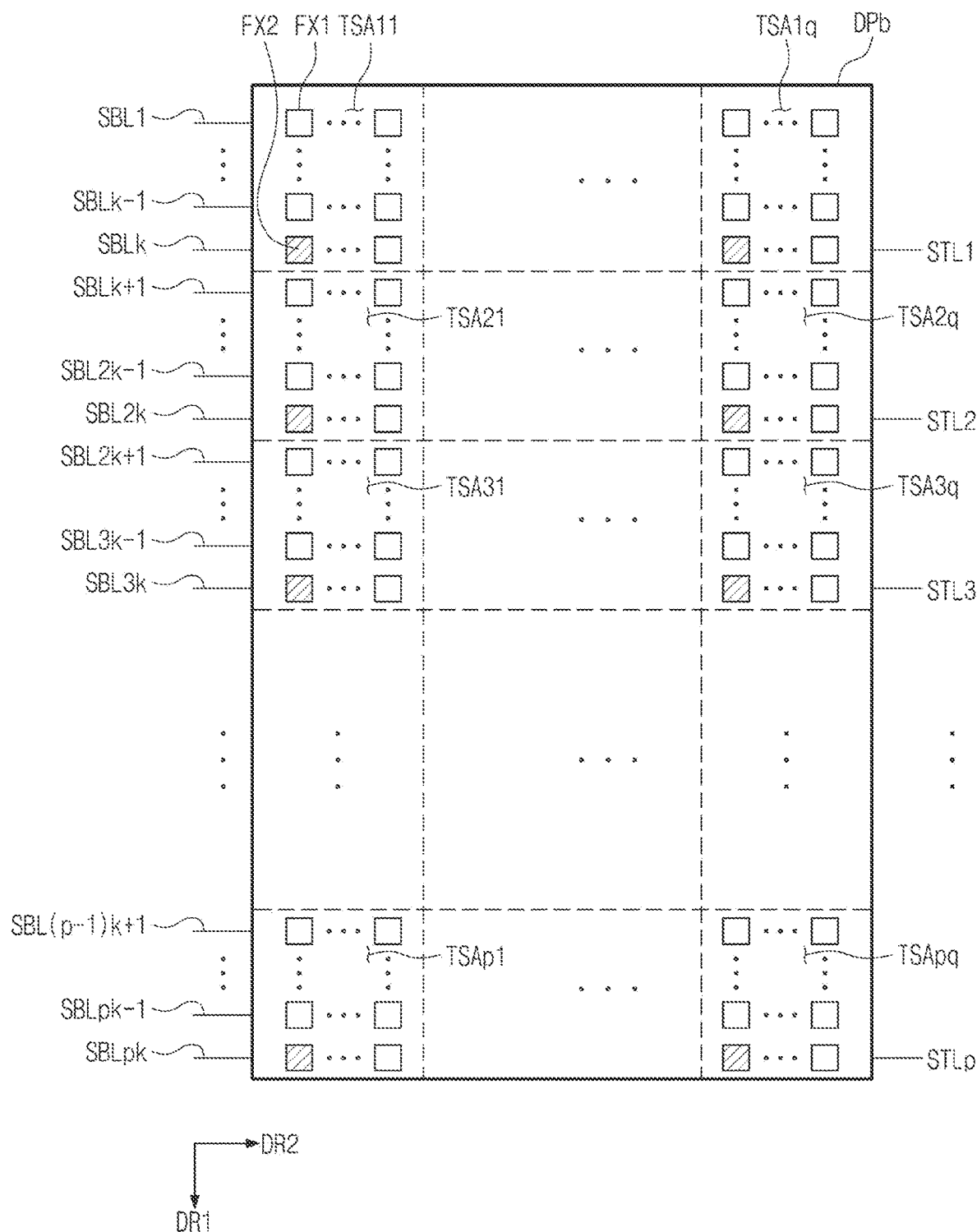
FIG. 10 is a plan view of a display panel, according to some embodiments of the present disclosure.

FIG. 10 is a plan view of a display panel, according to some embodiments of the present disclosure.

Referring to FIG. 10, a display panel DPb according to some embodiments of the present disclosure includes a plurality of touch sensing area TSA11 to TSA1$q$, TSA21 to TSA2$q$, TSA31 to TSA3$q$, and TSAp1 to TSApq (e.g., "pxq" touch sensing areas). Here, each of 'p' and 'q' may be an integer of 2 or greater. The plurality of touch sensing areas TSA11 to TSApq may be arranged in a matrix form in the first direction DR1 and the second direction DR2. One or more touch scan lines STL1, STL2, and STL3 to STLp may be provided in each of the plurality of touch sensing areas TSA11 to TSApq. According to some embodiments of the present disclosure, it is shown that the touch scan lines STL1 to STLp are respectively arranged in the touch sensing areas TSA11 to TSApq, but the present disclosure is not limited thereto. Two or more touch scan lines may be provided in each of the touch sensing areas TSA11 to TSApq.

'k' black scan lines SBL1 to SBLk, SBLk+1 to SBL2$k$, SBL2$k$+1 to SBL3$k$, and SBL(p−1)k+1 to SBLpk may be arranged in the touch sensing areas TSA11 to TSApq. The first sensor FX1 and the second sensor FX2 may be positioned in each of the touch sensing areas TSA11 to TSApq in a "kxk" matrix form. The first sensor FX1 may refer to a sensor not connected to a touch scan line, and the second sensor FX2 may refer to a sensor connected to the touch scan line. The first sensor FX1 may have a first circuit configuration, and the second sensor FX2 may have a second circuit configuration different from the first circuit configuration.

The one second sensor FX2 may be positioned in each of the touch sensing areas TSA11 to TSApq. The second sensors FX2 may be positioned in the same row in the second direction DR2 and may be connected to the same touch scan line. In more detail, the second sensors FX2 included in the touch sensor areas TSA11 to TSA1$q$ in the first row are connected to the first touch scan line STL1. The second sensors FX2 included in the touch sensor areas TSA21 to TSA2$q$ in the second row are connected to the second touch scan line STL2.

However, the number of second sensors FX2 provided in each of the touch sensing areas TSA11 to TSApq is not particularly limited thereto. For example, the second sensors, of which the number is not less than 2 or is less than 'k', may be positioned in each of the touch sensing areas TSA11 to TSApq.

Figure 11A:
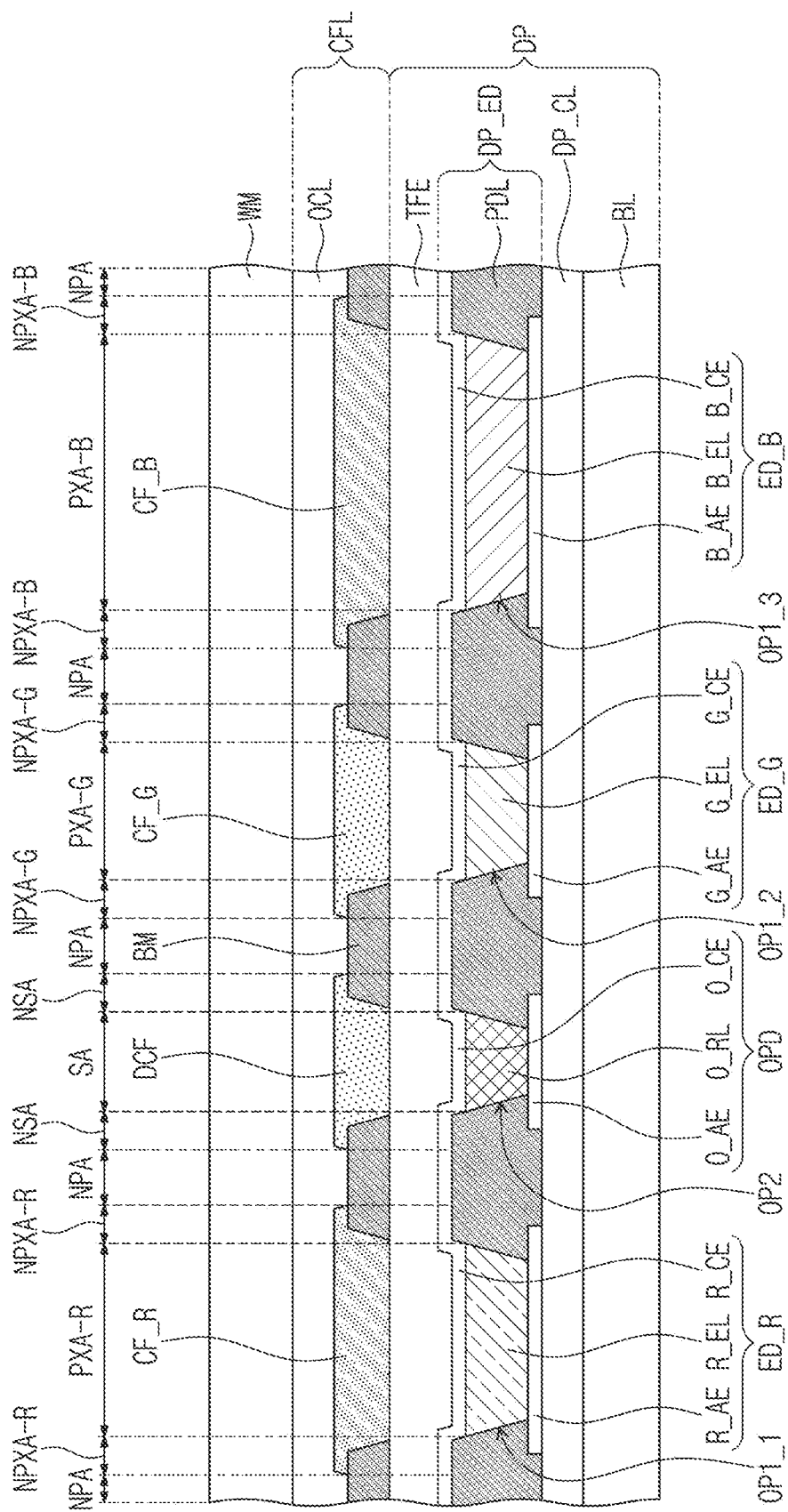
FIGS. 11A and 11B are cross-sectional views illustrating a light emitting element and a light receiving element of a display panel, according to some embodiments of the present disclosure.
Figure 11B:
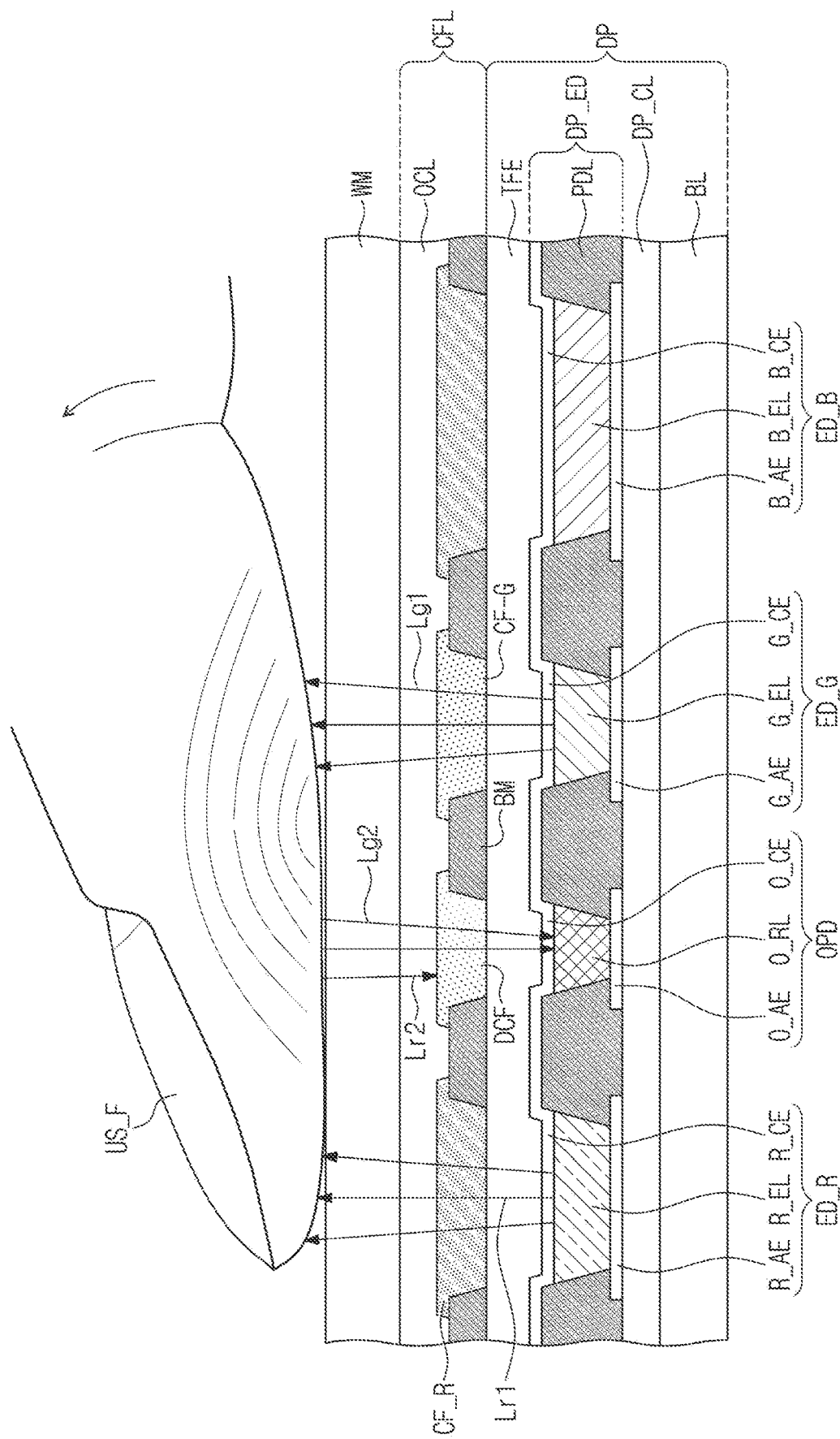

FIGS. 11A and 11B are cross-sectional views illustrating a light emitting element and a light receiving element of a display panel, according to some embodiments of the present disclosure.

Referring to FIGS. 11A and 11B, an input sensing layer (or an input sensing panel) for sensing an external input is not located on the display panel DP. That is, an input sensing layer (or an input sensing panel) may not be interposed between the display panel DP and the window WM, and the color filter layer CFL may be interposed between the display panel DP and the window WM.

The display panel DP includes the base layer BL, the circuit layer DP_CL, the element layer DP_ED, and the encapsulation layer TFE. The element layer DP_ED includes a first electrode layer located on the circuit layer DP_CL and a pixel defining layer PDL located on the first electrode layer. The first electrode layer may include red, green, and blue anode electrodes R_AE, G_AE, and B_AE. First to third light emitting openings OP1_1, OP1_2, and OP1_3 may be provided in the pixel defining layer PDL. The first to third light emitting openings OP1_1, OP1_2, and OP1_3 expose at least part of the red, green and blue anodes R_AE, G_AE, and B_AE, respectively. According to some embodiments of the present disclosure, the pixel defining layer PDL may further include a black material. The pixel defining layer PDL may further include a black organic dye/pigment such as carbon black, aniline black, or the like. The pixel defining layer PDL may be formed by mixing a blue organic material and a black organic material. The pixel defining layer PDL may further include a liquid-repellent organic material.

As illustrated in FIG. 11A, the display panel DP may include first to third emission areas PXA-R, PXA-G, and PXA-B and first to third non-emission areas NPXA-G, NPXA-B, and NPXA-R adjacent to the first to third emission areas PXA-R, PXA-G, and PXA-B. The non-emission areas NPXA-R, NPXA-G, and NPXA-B may surround the corresponding emission areas PXA-R, PXA-G, and PXA-B, respectively. According to some embodiments, the first emission area PXA-R is defined to correspond to a partial area of the red anode electrode R_AE exposed by the first light emitting opening OP1_1. The second emission area PXA-G is defined to correspond to a partial area of the green anode electrode G_AE exposed by the second light emitting opening OP1_2. The third emission area PXA-B is defined to correspond to a partial area of the blue anode electrode B_AE exposed by the third light emitting opening OP1_3. Non-pixel areas NPA may be defined between the first to third non-emission areas NPXA-R, NPXA-G, and NPXA-B.

A light emitting layer may be located on the first electrode layer. The light emitting layer may include red, green, and blue light emitting layers R_EL, G_EL, and B_EL. The red, green, and blue light emitting layers R_EL, G_EL, and B_EL may be located in areas corresponding to the first to third light emitting openings OP1_1, OP1_2, and OP1_3, respectively. The red, green, and blue light emitting layers R_EL, G_EL, and B_EL may be formed separately. Each of the red, green, and blue light emitting layers R_EL, G_EL, and B_EL may include an organic material and/or an inorganic material. The red, green, and blue light emitting layers R_EL, G_EL, and B_EL may generate a colored light (e.g., a set or predetermined color light). For example, the red light emitting layer R_EL may generate red light; the green light emitting layer G_EL may generate green light; and, the blue light emitting layer B_EL may generate blue light.

According to some embodiments, the patterned red, green and blue light emitting layers R_EL, G_EL, and B_EL are shown. However, one light emitting layer may be located in the first to third emission areas PXA-R, PXA-G, and PXA-B in common. At this time, the light emitting layer may generate white light or blue light. Also, the light emitting layer may have a multi-layer structure that is referred to as "tandem".

Each of the red, green, and blue light emitting layers R_EL, G_EL, and B_EL may include a low molecular weight organic material or a high molecular weight organic material as a light emitting material. Alternatively, each of the red, green, and blue light emitting layers R_EL, G_EL, and B_EL may include a quantum dot material as a light emitting material. The core of a quantum dot may be selected from a group II-VI compound, a group III-V compound, a group IV-VI compound, a group IV element, a group IV compound, and a combination thereof.

A second electrode layer is located on the red, green and blue light emitting layers R_EL, G_EL, and B_EL. The second electrode layer may include red, green, and blue cathode electrodes R_CE, G_CE, and B_CE. The red, green, and blue cathode electrodes R_CE, G_CE, and B_CE may be electrically connected to one another. According to some embodiments of the present disclosure, the red, green, and blue cathode electrodes R_CE, G_CE, and B_CE may have an integral shape. In this case, the red, green, and blue cathode electrodes R_CE, G_CE, and B_CE may be arranged in common in the first to third emission areas PXA-R, PXA-G, and PXA-B, the first to third non-emission areas NPXA-R, NPXA-G, and NPXA-B, and the non-pixel area NPA.

The element layer DP_ED may further include the light receiving element OPD. The light receiving element OPD may be a photodiode. The pixel defining layer PDL may further include a light receiving opening OP2 that is provided to correspond to the light receiving element OPD.

The light receiving element OPD may include an anode electrode O_AE, a photoelectric conversion layer O_RL, and a cathode electrode O_CE. The anode electrode O_AE may be located on the same layer as the first electrode layer. That is, the anode electrode O_AE may be located on the circuit layer DP_CL and may be simultaneously (or concurrently) formed through the same process as the red, green, and blue anode electrodes R_AE, G_AE, and B_AE.

The light receiving opening OP2 of the pixel defining layer PDL exposes at least part of the anode electrode O_AE of the light receiving element OPD. The photoelectric conversion layer O_RL is located on the anode electrode O_AE exposed by the light receiving opening OP2. The photoelectric conversion layer O_RL may include an organic photosensing material. The cathode electrode O_CE may be located on the photoelectric conversion layer O_RL. The cathode electrode O_CE may be simultaneously (or concurrently) formed through the same process as the red, green, and blue cathode electrodes R_CE, G_CE, and B_CE. According to some embodiments of the present disclosure, the sensing cathode electrode O_CE has an integral shape with the red, green, and blue cathode electrodes R_CE, G_CE, and B_CE, thereby forming a common cathode electrode.

The encapsulation layer TFE is located on the element layer DP_ED. The encapsulation layer TFE includes at least one inorganic layer or at least one organic layer. According to some embodiments of the present disclosure, the encapsulation layer TFE may include two inorganic layers and an organic layer located between the two inorganic layers. Alternatively, the encapsulation layer may include a plurality of inorganic layers and a plurality of organic layers, which are alternately stacked.

The at least one inorganic layer protects the red, green and blue light emitting elements ED_R, ED_G, and ED_B and the light receiving element OPD from moisture/oxygen, and the at least one organic layer protects the red, green and blue light emitting elements ED_R, ED_G, and ED_B and the light receiving element OPD from foreign substances. The at least one inorganic layer may include a silicon nitride layer, a silicon oxynitride layer, a silicon oxide layer, a titanium oxide layer, an aluminum oxide layer, or the like, but is not specifically limited thereto. The at least one organic layer may include an acryl-based organic layer, and is not specifically limited thereto.

According to some embodiments of the present disclosure, the color filter layer CFL may be directly located on the encapsulation layer TFE. The color filter layer CFL may include a first color filter CF_R, a second color filter CF_G, and a third color filter CF_B. The first color filter CF_R has a first color; the second color filter CF_G has a second color; and, the third color filter CF_B has a third color. According to some embodiments of the present disclosure, the first color may be red; the second color may be green; and, the third color may be blue.

The color filter layer CFL may further include a dummy color filter DCF. According to some embodiments of the present disclosure, when an area where the photoelectric conversion layer O_RL is located is defined as a sensing area SA, and a periphery of the sensing area SA is defined as a non-sensing area NSA, the dummy color filter DCF may be arranged to correspond to the sensing area SA. The dummy color filter DCF may overlap the sensing area SA and the non-sensing area NSA. According to some embodiments of the present disclosure, the dummy color filter DCF may have the same color as one of the first to third color filters CF_R, CF_G, and CF_B. According to some embodiments of the present disclosure, the dummy color filter DCF may have the same green color as the second color filter CF_G.

The color filter layer CFL may further include a black matrix BM. The black matrix BM may be arranged to correspond to the non-pixel area NPA. According to some embodiments of the present disclosure, the black matrix BM may overlap the non-pixel area NPA and the first to third non-emission areas NPXA-R, NPXA-G, and NPXA-B. The black matrix BM may not overlap the first to third emission areas PXA-R, PXR-G, and PXA-B.

The color filter layer CFL may further include an overcoat layer OCL. The overcoat layer OCL may include an organic insulating material. The overcoat layer OCL may be provided with a thickness sufficient to remove a step between the first to third color filters CF_R, CF_G, and CF_B. A material of the overcoat layer OCL may not be particularly limited as long as the material is capable of planarizing an upper surface of the color filter layer CFL with a given thickness and may include, for example, an acrylate-based organic material.

Referring to FIG. 11B, when the display device DD (see FIG. 1) operates, each of the red, green, and blue light emitting elements ED_R, ED_G, and ED_B may output light. The red light emitting elements ED_R output red light in a red wavelength band; the green light emitting elements ED_G output green light in a green wavelength band; and, the blue light emitting elements ED_B output blue light in a blue wavelength band.

According to some embodiments of the present disclosure, the light receiving element OPD may receive light from specific light emitting elements (e.g., the green light emitting elements ED_G) among the red, green, and blue light emitting elements ED_R, ED_G, and ED_B. That is, the light receiving element OPD may receive green reflection light Lg2 reflected by a user's fingerprint after green light Lg1 is output from the green light emitting elements ED_G. The green light Lg1 and the green reflection light Lg2 may be light in a green wavelength band. A dummy color filter DCF is located over the light receiving element OPD. The dummy color filter DCF may have a green color. Accordingly, the green reflection light Lg2 may pass through the dummy color filter DCF and may be incident onto the light receiving element OPD.

Meanwhile, red light and blue light output from the red and blue light emitting elements ED_R and ED_B may also be reflected by the user's hand US_F. For example, when light reflected by the user's hand US_F after red light Lr1 is output from the red light emitting element ED_R is defined as red reflection light Lr2, the red reflection light Lr2 may be absorbed without passing through the dummy color filter DCF. That is, because the red reflection light Lr2 fails to pass through the dummy color filter DCF, the red reflection light Lr2 may not be incident onto the light receiving element OPD. Likewise, even though blue light is reflected by the user's hand US_F, the blue light may be absorbed by the dummy color filter DCF. Accordingly, only the green reflection light Lg2 may be provided to the light receiving element OPD.

Although aspects of some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to some embodiments of the present disclosure, because a display device may be capable of detecting an external input by using sensors provided in a display panel and then recognizing biometric information, a separate input sensing layer or input sensing panel for detecting an external input may be omitted from the display device. Accordingly, the overall thickness of the display device may be relatively reduced compared to a display device that includes a separate input sensing layer. Additionally, a process of forming an input sensing layer or an input sensing panel may be omitted, thereby simplifying a manufacturing process of a display device.

While aspects of some embodiments of the present disclosure have been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. A display device comprising:
   a plurality of pixels, each of which includes a light emitting element and a pixel driving circuit connected to the light emitting element; and
   a plurality of sensors, each of which includes a light receiving element and a sensor driving circuit connected to the light receiving element,
   wherein the sensor driving circuit included in at least one sensor from among the sensors includes:
   a reset transistor including a first electrode configured to receive a reset signal, a second electrode connected to a first sensing node, and a third electrode configured to receive a reset control signal;
   an amplification transistor including a first electrode configured to receive a sensor driving voltage, a second electrode connected to the first sensing node, and a third electrode connected to a second sensing node;
   a first output transistor including a first electrode connected to the second sensing node, a second electrode connected to a readout line, and a third electrode configured to receive a first output control signal; and
   a second output transistor including a first electrode connected to the second sensing node, a second electrode connected to the readout line, and a third electrode configured to receive a second output control signal.

2. The display device of claim 1, wherein the first output control signal includes a first active period in which the first output transistor is turned on,
   wherein the second output control signal includes a second active period in which the second output transistor is turned on, and
   wherein the first active period and the second active period do not overlap each other.

3. The display device of claim 1, wherein sensor driving circuits respectively included in the sensors have a same configuration.

4. The display device of claim 1, wherein a first sensor from among the sensors includes a first sensor driving circuit having a first circuit configuration, and
   wherein a second sensor from among the sensors includes a second sensor driving circuit having a second circuit configuration different from the first circuit configuration.

5. The display device of claim 4, wherein the first sensor driving circuit includes the reset transistor, the amplification transistor, and the first output transistor, and
wherein the second sensor driving circuit includes the reset transistor, the amplification transistor, the first output transistor, and the second output transistor.

6. The display device of claim 5, wherein the sensors are arranged in a first direction and a second direction crossing the first direction,
wherein 'k−1' first sensors are positioned between two second sensors adjacent to each other in the first direction, and
wherein the 'k' is an integer that is not less than 2.

7. The display device of claim 1, wherein the pixel driving circuit includes:
a first transistor connected between a first driving voltage line configured to receive a first driving voltage and the light emitting element;
a second transistor connected between a data line and a first electrode of the first transistor; and
a third transistor connected between a second electrode of the first transistor and a first node and configured to receive a first scan signal.

8. The display device of claim 7, wherein the pixel driving circuit further includes:
a fourth transistor connected between a first initialization line, to which a first initialization voltage is applied, and the first node and configured to receive a second scan signal; and
a fifth transistor connected between a second initialization line, to which a second initialization voltage is applied, and the light emitting element and configured to receive a third scan signal.

9. The display device of claim 8, wherein the first output transistor is configured to receive one of the first scan signal, the second scan signal, and the third scan signal as the first output control signal.

10. The display device of claim 8, further comprising:
a pixel scan driver configured to output the first scan signal, the second scan signal, and the third scan signal; and
a touch scan driver configured to output a touch scan signal sequentially,
wherein the second output transistor is configured to receive the touch scan signal as the second output control signal.

11. The display device of claim 10, wherein the pixel scan driver includes 'n' driving stages,
wherein the touch scan driver includes 'n' touch stages, and
wherein the 'n' is an integer that is not less than 2.

12. The display device of claim 10, wherein the pixel scan driver includes 'n' driving stages,
wherein the touch scan driver includes 'p' touch stages, and
wherein the 'p' is an integer that is not less than 2, and the 'n' is an integer greater than the 'p'.

13. The display device of claim 1, wherein the reset transistor and the first output transistor are transistors having different types from each other, and
wherein the first output transistor and the second output transistor are transistors having the same types as each other.

14. The display device of claim 1, wherein the first output transistor and the second output transistor are transistors having different types from each other, and
wherein the reset transistor and the second output transistor are transistors having the same types as each other.

15. A display device comprising:
a display panel including:
a base layer;
a circuit layer on the base layer; and
an element layer on the circuit layer and including a plurality of light emitting elements and a plurality of light receiving elements,
wherein the circuit layer includes a plurality of pixel driving circuits connected to the plurality of light emitting elements and a plurality of sensor driving circuits connected to the plurality of light receiving elements, and
wherein at least one of the plurality of sensor driving circuits includes:
a reset transistor including a first electrode configured to receive a reset signal, a second electrode connected to a first sensing node, and a third electrode configured to receive a reset control signal;
an amplification transistor including a first electrode configured to receive a sensor driving voltage, a second electrode connected to the first sensing node, and a third electrode connected to a second sensing node;
a first output transistor including a first electrode connected to the second sensing node, a second electrode connected to a readout line, and a third electrode configured to receive a first output control signal; and
a second output transistor including a first electrode connected to the second sensing node, a second electrode connected to the readout line, and a third electrode configured to receive a second output control signal.

16. The display device of claim 15, further comprising:
a pixel scan driver electrically connected to the plurality of pixel driving circuits; and
a touch scan driver electrically connected to the plurality of sensor driving circuits.

17. The display device of claim 16, wherein the plurality of sensor driving circuits include:
a first sensor driving circuit having a first circuit configuration; and
a second sensor driving circuit having a second circuit configuration different from the first circuit configuration.

18. The display device of claim 17, wherein the display panel includes 'p' touch sensing areas,
wherein the pixel scan driver includes 'n' driving stages,
wherein the touch scan driver includes 'p' touch stages,
wherein the 'p' touch stages are respectively arranged to correspond to the 'p' touch sensing areas, and
wherein the 'p' is an integer that is not less than 2, and the 'n' is an integer greater than the 'p'.

19. The display device of claim 17, wherein the display panel includes "p×q" touch sensing areas,
wherein the "p×q" touch sensing areas are arranged in a matrix form in a first direction and a second direction,
wherein a plurality of first sensors and at least one second sensor are arranged in each of the "p×q" touch sensing areas, and
wherein each of the 'p' and the 'q' is an integer that is not less than 2.

20. The display device of claim 17, wherein the first sensor driving circuit includes the reset transistor, the amplification transistor, and the first output transistor, and wherein the second sensor driving circuit includes the reset transistor, the amplification transistor, the first output transistor, and the second output transistor.

* * * * *